(12) United States Patent
Kubota et al.

(10) Patent No.: US 12,356,879 B2
(45) Date of Patent: Jul. 15, 2025

(54) SUPPORT SYSTEM FOR WORKING VEHICLE

(71) Applicant: KUBOTA CORPORATION, Osaka (JP)

(72) Inventors: Yuki Kubota, Sakai (JP); Yoshiaki Hiruta, Sakai (JP); Tsuyoshi Gono, Sakai (JP); Ryosuke Kinugawa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 309 days.

(21) Appl. No.: 18/200,607

(22) Filed: May 23, 2023

(65) Prior Publication Data

US 2023/0403967 A1 Dec. 21, 2023

(30) Foreign Application Priority Data

May 24, 2022 (JP) .................................. 2022-084666

(51) Int. Cl.
*A01B 69/00* (2006.01)
*A01B 69/04* (2006.01)
(52) U.S. Cl.
CPC .................................. *A01B 69/008* (2013.01)
(58) Field of Classification Search
CPC .................................................. A01B 69/008
See application file for complete search history.

(56) References Cited

U.S. PATENT DOCUMENTS

| 11,369,861 | B2 * | 6/2022 | McGuffie | G01C 15/04 |
|---|---|---|---|---|
| 2021/0302962 | A1 * | 9/2021 | Sakaguchi | G05D 1/0212 |
| 2023/0121416 | A1 * | 4/2023 | Maeder | G05D 1/227 |
| | | | | 701/26 |
| 2025/0072310 | A1 * | 3/2025 | Nishii | A01B 69/001 |

FOREIGN PATENT DOCUMENTS

| JP | 2017123803 | A * | 7/2017 | A01B 51/02 |
|---|---|---|---|---|
| WO | WO-2017195510 | A1 * | 11/2017 | G05D 1/02 |
| WO | WO-2019124217 | A1 * | 6/2019 | A01B 69/00 |

\* cited by examiner

*Primary Examiner* — Peter D Nolan
*Assistant Examiner* — Peter Y Ning
(74) *Attorney, Agent, or Firm* — Keating & Bennett, LLP

(57) ABSTRACT

A support system for a working vehicle includes a working vehicle including a vehicle body to travel selectively under manual steering or automatic steering, a controller, and a communicator, the controller is configured or programmed to define a planned travel line for and control the automatic steering based on a reference line, the communicator receiving a replacement line for replacing the reference line, and a server to transmit the replacement line to the communicator. The controller includes a status acquirer to acquire a status of a device provided in or on the working vehicle, and is configured or programmed to, in accordance with the status acquired by the status acquirer, switch between a first mode in which the controller replaces the reference line with the replacement line transmitted from the server and a second mode in which the controller does not replace the reference line with the replacement line.

12 Claims, 33 Drawing Sheets

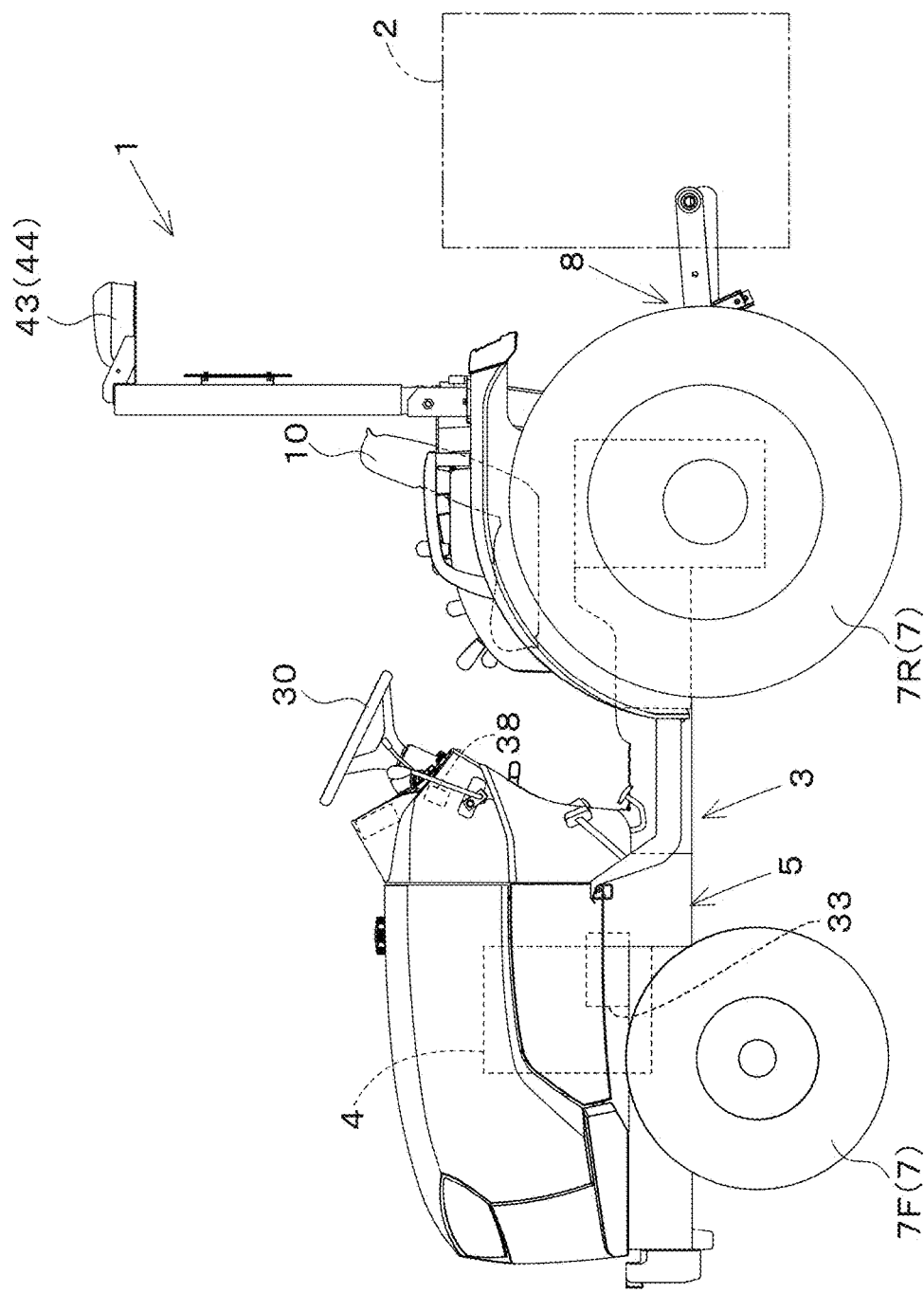

SUPPORT SYSTEM FOR WORKING VEHICLE

CROSS REFERENCE TO RELATED APPLICATIONS

This application claims the benefit of priority to Japanese Patent Application No. 2022-084666 filed on May 24, 2022. The entire contents of this application are hereby incorporated herein by reference.

BACKGROUND OF THE INVENTION

1. Field of the Invention

The present invention relates to support systems for working vehicles.

2. Description of the Related Art

A known agricultural working machine is disclosed in Japanese Unexamined Patent Application Publication No. 2017-123803. The agricultural working machine disclosed in Japanese Unexamined Patent Application Publication No. 2017-123803 includes a traveling machine body switchable between manual travel and automatic travel, and a switch for switching between the manual travel and the automatic travel. The manual travel is based on manual steering, whereas the automatic travel involves traveling based on automatic steering along a preset travel line set parallel to a reference travel line. In the agricultural working machine according to Japanese Unexamined Patent Application Publication No. 2017-123803, when a right command button is operated while the agricultural working machine is traveling along a ridge, a start point for the reference travel line is set. When a left command button is operated while the agricultural working machine is traveling, a goal point for the reference travel line is set. In other words, in the agricultural working machine according to Japanese Unexamined Patent Application Publication No. 2017-123803, the reference travel line is set during the manual travel before automatic steering is performed.

SUMMARY OF THE INVENTION

In the above-described technology disclosed in Japanese Unexamined Patent Application Publication No. 2017-123803, when automatic steering is to be performed in accordance with a new reference travel line or when a different agricultural working machine is made to perform automatic steering in the same agricultural field, the manual travel has to be performed again from the beginning to set the reference travel line.

A method for avoiding the manual travel would be to transmit a new reference travel line (replacement line) from an external device, such as a server, to the agricultural working machine. However, depending on the transmission timing of the replacement line, automatic steering may possibly be performed on an unintended path due to the replacement line.

Preferred embodiments of the present invention provide support systems for working vehicles that each can prevent or reduce automatic steering that causes the working vehicle to travel on an unintended path.

A support system for a working vehicle according to an aspect of a preferred embodiment of the present invention includes a working vehicle including a vehicle body, a controller, and a communicator, the vehicle body being operable to travel selectively under manual steering using a steering device or under automatic steering using the steering device, the controller being configured or programmed to define a planned travel line for the automatic steering based on a reference line and to control the automatic steering, the communicator being configured or programmed to receive a replacement line to replace the reference line defined by the controller, and a server to transmit the replacement line to the communicator, wherein the controller is configured or programmed to include a status acquirer to acquire a status of a device provided in or on the working vehicle, and to switch between a first mode and a second mode in accordance with the status acquired by the status acquirer, the first mode being a mode in which the controller replaces the reference line with the replacement line transmitted from the server, the second mode being a mode in which the controller does not replace the reference line with the replacement line transmitted from the server.

The working vehicle may include a first operation actuator to receive an operation and change a setting relating to the automatic steering. The status acquirer may be configured or programmed to acquire information indicating that the first operation actuator has received the operation to change the setting or has not received the operation to change the setting. The controller may be configured or programmed to enter the first mode if the status acquirer acquires information indicating that the first operation actuator has received the operation to change the setting, and enter the second mode if the status acquirer acquires information indicating that the first operation actuator has not received the operation to change the setting.

The working vehicle may include a second operation actuator to receive an operation and enable or disable the automatic steering. The status acquirer may be configured or programmed to acquire information indicating that the automatic steering is enabled or disabled by the second operation actuator. The controller may be configured or programmed to enter the first mode if the status acquirer acquires information indicating that the automatic steering is disabled by the second operation actuator, and enter the second mode if the status acquirer acquires information indicating that the automatic steering is enabled by the second operation actuator.

The status acquirer may be configured or programmed to acquire information indicating that the vehicle body has stopped traveling or is traveling. The controller may be configured or programmed to enter the first mode if the status acquirer acquires information indicating that the vehicle body has stopped traveling, and enter the second mode if the status acquirer acquires information indicating that the vehicle body is traveling.

The controller may be configured or programmed to, when the controller is in the first mode, allow the communicator to receive the replacement line from the server, and when the controller is in the second mode, restrict the communicator from receiving the replacement line from the server.

The controller may be configured or programmed to, when the controller is in the first mode, register, as the reference line, the replacement line received by the communicator from the server, and when the controller is in the second mode, retain the replacement line received by the communicator from the server without registering the replacement line as the reference line, and register the retained replacement line as the reference line when the controller enters the first mode.

The working vehicle may include a display to display the replacement line received by the communicator.

The display may include a changer to receive a change to the replacement line received by the communicator.

The working vehicle may include a detector to detect a position of the vehicle body. The communicator may be configured or programmed to transmit the position of the vehicle body detected by the detector to the server. The server may be operable to transmit the replacement line to the communicator in accordance with the position of the vehicle body.

The server may include a database to store a plurality of the replacement lines in association with respective pieces of positional information of respective agricultural fields, and a transmitter to transmit, to the communicator, one of the plurality of replacement lines stored in the database that corresponds to the position of the vehicle body transmitted from the communicator in accordance with the position of the vehicle body.

The support system may further include a portable terminal to communicate with the communicator and the server. The portable terminal may include a command generator to command the server to transmit the replacement line to the communicator in accordance with what operation is performed on the portable terminal.

The server may include a database to store a plurality of the replacement lines. The portable terminal may include a replacement line definer to receive a selection of one of the plurality of replacement lines stored in the database and define the replacement line. The command generator may be configured or programmed to command the server to transmit the replacement line defined by the replacement line definer to the communicator.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 2 is an overall view of a tractor (working vehicle).

DETAILED DESCRIPTION OF THE PREFERRED EMBODIMENTS

Figure 1:
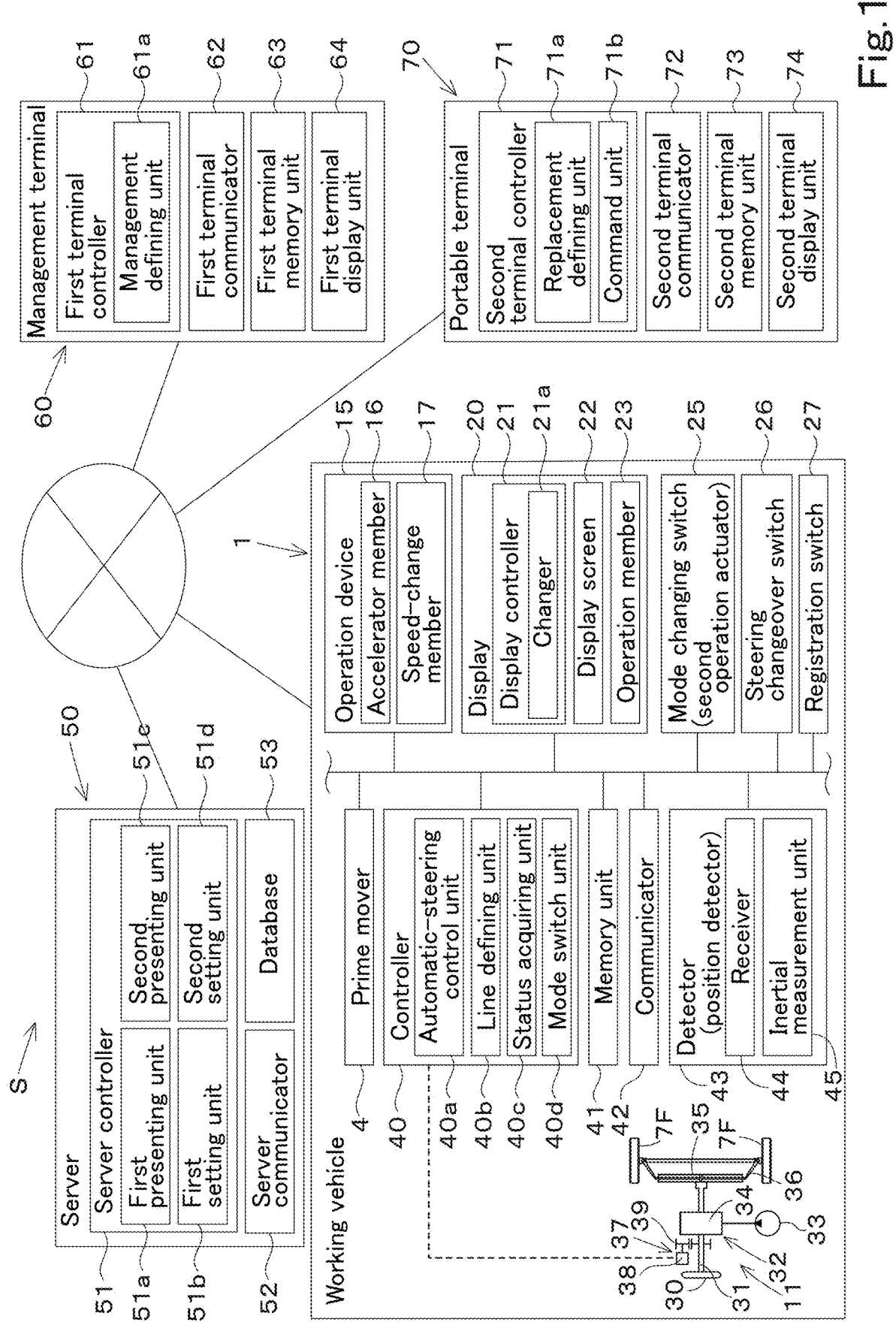
FIG. 1 is an overall view of a support system for a working vehicle.

The preferred embodiments will now be described with reference to the accompanying drawings, wherein like reference numerals designate corresponding or identical elements throughout the various drawings. The drawings are to be viewed in an orientation in which the reference numerals are viewed correctly.

Preferred embodiments of the present invention will be described below with reference to the drawings.

FIG. 1 is an overall view of a support system for a working vehicle (hereinafter may be referred to as a "working-vehicle support system") S according to this preferred embodiment. In the working-vehicle support system S, a server 50 transmits a replacement line L4 to a working vehicle 1, the working vehicle 1 replaces a reference line L1 in accordance with the replacement line L4, and automatic steering can be performed in accordance with a planned travel line L2 based on the replacement line L4 (i.e., updated reference line L1). As illustrated in FIG. 1, the working-vehicle support system S includes the working vehicle 1, the server 50, a management terminal 60, and a portable terminal 70.

In this preferred embodiment, the working vehicle 1 is a tractor. The working vehicle 1 is not limited to a tractor and may be an agricultural machine (agricultural vehicle), such as a combine or a transplanter, or a construction machine (construction vehicle), such as a loader working machine, so long as the working vehicle 1 includes a vehicle body 3 capable of traveling selectively under manual steering or automatic steering according to the planned travel line L2 based on the reference line L1.

FIG. 2 is an overall side view of the working vehicle 1. The tractor (working vehicle 1) will be described first with reference to FIG. 1 and FIG. 2. In this preferred embodiment, a direction (leftward in FIG. 2) that an operator sitting in an operator's seat 10 of the working vehicle 1 faces will be defined as a forward direction, and a direction (rightward in FIG. 2) opposite thereto will be defined as a rearward direction. The left (near side in FIG. 2) of the operator will be defined as a leftward direction, and the right (far side in FIG. 2) of the operator will be defined as a rightward direction.

As illustrated in FIG. 2, the working vehicle 1 includes the vehicle body 3, a prime mover 4, and a transmission 5. The vehicle body 3 includes a traveling device 7 and is capable of traveling by using the traveling device 7. The vehicle body 3 is capable of traveling in either the manual steering or the automatic steering according to the planned travel line L2 based on the reference line L1.

The traveling device 7 includes front wheels 7F and rear wheels 7R. Although the front wheels 7F and the rear wheels 7R are tires in the example illustrated in FIG. 2, the front wheels 7F and the rear wheels 7R may be crawlers.

The prime mover 4 is, for example, a diesel engine or an electric motor, and is a diesel engine in this preferred embodiment. The transmission 5 is capable of changing a propulsion force of the traveling device 7 by switching speed stages, and is also capable of switching the traveling device 7 between a forward motion and a rearward motion. As illustrated in FIG. 2, the vehicle body 3 is provided with the operator's seat 10 where the operator sits.

The rear portion of the vehicle body 3 is provided with a coupler 8 including a three-point linkage. A working device 2 is attachable to and detachable from the coupler 8. By coupling the working device 2 to the coupler 8 and driving the traveling device 7, the working vehicle 1 can tow the coupled working device 2. The working device 2 is, for example, a cultivator for performing a cultivation process, a fertilizer spreader for spreading fertilizers, an agricultural chemical spreader for spreading agricultural chemicals, a harvester for performing harvesting, a mower for mowing, for example, grass, a tedder for tedding, for example, grass, a rake for raking, for example, grass, or a baler for baling, for example, grass.

The working device 2 is not limited to the above-described example so long as the working device 2 is coupled to the coupler 8 of the working vehicle 1 or is provided in the working vehicle 1 and performs work. For example, if the working vehicle 1 is a combine, the working device 2 includes a mower for mowing a crop and a thresher for performing threshing. If the working vehicle 1 is a rice planter, the working device 2 includes a cropper for planting seedlings.

As illustrated in FIG. 1, the working vehicle 1 includes a controller 40 and a memory unit 41. The controller 40 controls a traveling system and a working system in the working vehicle 1. The controller 40 includes electric and electronic component(s) and/or program(s).

The memory unit 41 is a nonvolatile memory and can store, for example, various programs and various types of information related to the working vehicle 1.

The controller 40 is connected to an operation device 15 used for operating the working vehicle 1. The operation device 15 includes an accelerator member (accelerator pedal, accelerator lever) 16 provided in the vehicle body 3 and a speed-change member (shift lever, speed-change switch) 17. The accelerator member 16 is used by the operator for manually operating the traveling speed, that is, the vehicle speed, of the working vehicle 1 (vehicle body 3). Based on an operation signal input from the accelerator member 16, the controller 40 controls the traveling speed of the vehicle body 3. In detail, the controller 40 controls the traveling speed of the vehicle body 3 based on an operational amount of the accelerator member 16 and a control map preliminarily stored in the memory unit 41.

The speed-change member 17 is used by the operator for manually operating the speed stage of the transmission 5. Based on an operation signal input from the speed-change member 17, the controller 40 changes the speed stage of the transmission 5. As an alternative to this preferred embodiment in which the controller 40 changes the speed stage of the transmission 5 based on an operation performed on the speed-change member 17, the speed-change member 17 may be configured to change the speed stage of the transmission 5 directly without the intervention of the controller 40.

As illustrated in FIG. 1, the working vehicle 1 includes a display 20 that displays information. The operator can change various settings of the working vehicle 1 by operating the display 20. The display 20 includes a display controller 21, a display screen 22, and an operation member 23. The display controller 21 performs various types of control related to the display 20 and controls, for example, the display screen 22 to cause the display screen 22 to display various types of information. The display controller 21 includes electric and electronic component(s) and/or program(s). The display controller 21 causes the display screen 22 to display information about the working vehicle 1 acquired by the controller 40 or causes the display screen 22 to display a guidance screen to provide operational guidance for the working vehicle 1 to the operator.

The display controller 21 causes the display screen 22 to display, for example, a display image operable in response to an operation performed on the operation member 23 or optional display images, and receives a change in the settings of the controller 40 (working vehicle 1). Therefore, by applying the change in the settings received by the display controller 21, the controller 40 can change the settings of the working vehicle 1.

The operation member 23 is an operation actuator that receives an operation from the operator. In this preferred embodiment, the operation member 23 is a rotationally-operable dial switch having a plurality of switch positions. The dial switch is also operable by being pressed. The operation member 23 mainly receives a selecting operation of a display image by being rotated, and receives a confirming operation of the selected display image by being pressed.

Although an example where the operation member 23 is a dial switch is described in this preferred embodiment, the operation member 23 is not limited to a dial switch and may include a plurality of push button switches. Furthermore, the display 20 may be any device capable of receiving an operation from the operator. The display screen 22 may have a touchscreen in place of or in addition to the operation member 23, and receive an input of information in response to an operation performed by the operator by using a finger.

As illustrated in FIG. 1, the working vehicle 1 includes a communicator 42. The communicator 42 is communicable with the server 50 to be described later. For example, the communicator 42 performs wireless communication by using a data communication network or a portable telephone communication network. Alternatively, the communicator 42 may perform wireless communication by using, for example, Bluetooth (registered trademark) Low Energy in the Bluetooth (registered trademark) specification of the communication standard IEEE 802.15.1 series or WiFi (registered trademark) of the communication standard IEEE 802.11.n series, so long as the communicator 42 is communicable with the server 50.

As illustrated in FIG. 1, the working vehicle 1 includes a detector (position detector) 43. The detector 43 is capable of detecting positional information (measured position information including the latitude and the longitude) of the working vehicle 1 by using a satellite positioning system (positioning satellite), such as D-GPS, GPS, GLONASS, BeiDou, Galileo, or MICHIBIKI. Specifically, the detector 43 receives a satellite signal (e.g., the position of the positioning satellite and the transmission time) transmitted from a positioning satellite and detects positional information (e.g., the latitude and the longitude) based on the satellite signal. The detector 43 includes a receiver 44 and an inertial measurement unit (IMU) 45. The receiver 44 includes, for example, an antenna and receives a satellite signal transmitted from a positioning satellite, and is attached to the vehicle body 3 independently of the IMU 45. In this preferred embodiment, the receiver 44 is attached to a rollover protection structure (ROPS) provided in the vehicle body 3. The receiver 44 is not limited to being attached to the ROPS so long as the receiver 44 is capable of receiving a satellite signal transmitted from a positioning satellite.

The IMU 45 includes an accelerator sensor that detects acceleration and a gyroscope sensor that detects an angular velocity. The IMU 45 is provided in the vehicle body 3, such as below the operator's seat 10, and is capable of detecting a roll angle, a pitch angle, and a yaw angle of the vehicle body 3.

As illustrated in FIG. 1, the working vehicle 1 includes a steering device 11. The steering device 11 is capable of performing a manual steering involving steering the vehicle body 3 in response to an operation performed by the operator and an automatic steering involving steering the vehicle body 3 automatically without being dependent on an operation by the operator.

The steering device 11 includes a steering wheel 30 and a steering shaft (rotation shaft) 31 that rotatably supports the steering wheel 30. The steering device 11 also includes an assist mechanism (power steering device) 32. The assist mechanism 32 assists in rotating the steering shaft 31 (steering wheel 30) by using, for example, hydraulic pressure. The assist mechanism 32 includes a hydraulic pump 33, a control valve 34 supplied with a hydraulic fluid delivered from the hydraulic pump 33, and a steering cylinder 35 actuated by the control valve 34. The control valve 34 is, for example, a three-position switching valve switchable in response to movement of a spool, and is switched in correspondence with a steering direction (rotational direction) of the steering shaft 31. The steering cylinder 35 is connected to an arm (knuckle arm) 36 that changes the orientation of the front wheels 7F.

Accordingly, when the operator holds the steering wheel 30 and operates the steering wheel 30 in a first direction or a second direction opposite the first direction, the switch position and the opening of the control valve 34 change in correspondence with the rotational direction of the steering wheel 30. Therefore, the steering cylinder 35 expands or contracts leftward or rightward depending on the switch position and the opening of the control valve 34, whereby the steering direction of the front wheels 7F can be changed.

In other words, the vehicle body 3 can change its traveling direction leftward or rightward in accordance with manual steering of the steering wheel 30.

As illustrated in FIG. 1, the steering device 11 includes an automatic steering mechanism 37. The automatic steering mechanism 37 performs automatic steering to cause the vehicle body 3 to travel along the planned travel line L2. The automatic steering mechanism 37 includes a steering motor 38 and a gear mechanism 39. A rotational direction, a rotating speed, and a rotational angle of the steering motor 38 are controllable based on a vehicle-body position P. The gear mechanism 39 includes a gear that is provided at the steering shaft 31 and that rotates together with the steering shaft 31, and also includes a gear that is provided at a driving shaft of the steering motor 38 and that rotates together with the driving shaft. When the driving shaft of the steering motor 38 rotates, the steering shaft 31 rotates automatically via the gear mechanism 39, and the steering direction of the front wheels 7F can be changed such that the vehicle-body position P is aligned with the planned travel line L2.

As an alternative to this preferred embodiment in which the working vehicle 1 includes the steering device 11 having the steering wheel 30, and uses the steering device 11 to change the orientation of the front wheels 7F and to change the steering direction, the vehicle body 3 may be of any type so long as the steering direction (traveling direction) is changeable in accordance with the manual steering and the automatic steering. In other words, the steering device 11 is not limited to being configured to change the steering direction of the front wheels 7F by using the steering wheel 30. The mechanism for changing the traveling direction may utilize a related art technology, where appropriate.

Next, automatic steering control of the vehicle body 3 will be described. The working vehicle 1 can acquire a predetermined reference line L1 and perform the automatic steering based on the planned travel line L2 that is parallel to the reference line L1.

As illustrated in FIG. 1, the controller 40 includes an automatic-steering control unit 40a. The automatic-steering control unit 40a is provided in the controller 40 and includes electric and electronic component(s) provided in the controller 40 and/or program(s) installed in the memory unit 41.

As illustrated in FIGS. 3A to 3D, the automatic-steering control unit 40a controls the steering motor 38 of the automatic steering mechanism 37 based on travel information of the vehicle body 3 when the vehicle body 3 is performing the manual steering such that the vehicle body 3 travels along the planned travel line L2. The travel information of the vehicle body 3 is information detected by the detector 43 and indicating the position of the vehicle body 3 (vehicle-body position P) or bearing information indicating the bearing of the vehicle body 3 (vehicle-body bearing F). The automatic-steering control unit 40a controls the steering motor 38 of the automatic steering mechanism 37 such that the vehicle body 3 travels along the planned travel line L2. When the automatic-steering control unit 40a is performing the automatic steering, the operator can change the traveling speed of the vehicle body 3 and the speed stage of the transmission 5 by operating the accelerator member 16 and the speed-change member 17.

Figure 3A:
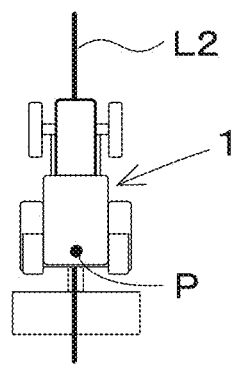
FIG. 3A is a diagram explaining automatic steering.
Figure 3B:
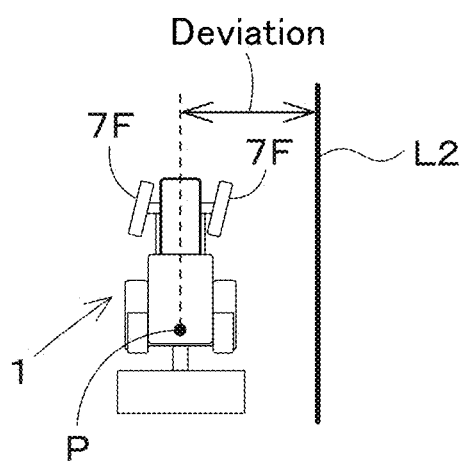
FIG. 3B is a diagram explaining the automatic steering.
Figure 3C:
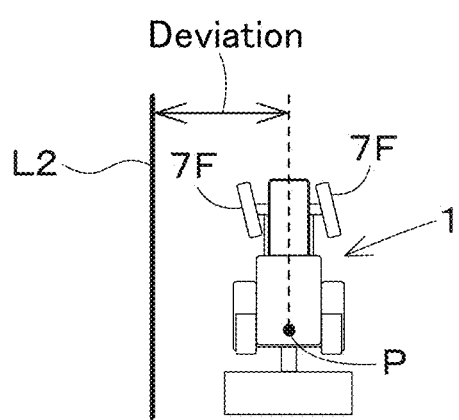
FIG. 3C is a diagram explaining the automatic steering.

The control of the automatic steering mechanism 37 by the automatic-steering control unit 40a will be described in detail below. FIGS. 3A to 3C illustrate a case where the travel information of the vehicle body 3 indicates the vehicle-body position P. As illustrated in FIG. 3A, if a deviation between the vehicle-body position P and the planned travel line L2 is smaller than a predetermined value, the automatic-steering control unit 40a maintains the rotational angle of the rotation shaft of the steering motor 38.

As illustrated in FIG. 3B, if the deviation (positional deviation) between the vehicle-body position P and the planned travel line L2 is larger than or equal to the predetermined value and the working vehicle 1 is positioned to the left of the planned travel line L2, the automatic-steering control unit 40a rotates the rotation shaft of the steering motor 38 such that the steering direction of the working vehicle 1 is oriented rightward. Specifically, if the deviation (positional deviation) between the vehicle-body position P and the planned travel line L2 is larger than or equal to the predetermined value and the working vehicle 1 is positioned to the left of the planned travel line L2, the automatic-steering control unit 40a changes the steering angle to set the positional deviation to zero, and steers the front wheels 7F rightward.

As illustrated in FIG. 3C, if the deviation between the vehicle-body position P and the planned travel line L2 is larger than or equal to the predetermined value and the working vehicle 1 is positioned to the right of the planned travel line L2, the automatic-steering control unit rotates the rotation shaft of the steering motor 38 such that the steering direction of the working vehicle 1 is oriented leftward. Specifically, if the deviation between the vehicle-body position P and the planned travel line L2 is larger than or equal to the predetermined value and the working vehicle 1 is positioned to the right of the planned travel line L2, the automatic-steering control unit changes the steering angle to set the positional deviation to zero, and steers the front wheels 7F leftward.

Figure 3D:
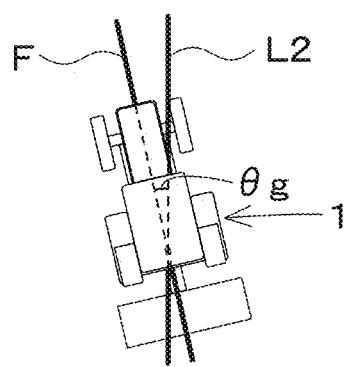
FIG. 3D is a diagram explaining the automatic steering.

In FIGS. 3A to 3C, the travel information of the vehicle body 3 indicates the vehicle-body position P and the steering angle of the steering device 11 is changed based on the deviation between the vehicle-body position P and the planned travel line L2. Alternatively, as illustrated in FIG. 3D, the travel information of the vehicle body 3 may be bearing information indicating the vehicle-body bearing F. In this case, if the bearing of the planned travel line L2 and the bearing (vehicle-body bearing) F of the traveling direction of the working vehicle 1 (vehicle body 3) are different from each other, that is, if an angle θg of the vehicle-body bearing F relative to the planned travel line L2 is larger than or equal to a predetermined value, the automatic-steering control unit 40a defines the steering angle to set the angle θg to zero (to align the vehicle-body bearing F with the bearing of the planned travel line L2). Moreover, based on a steering angle calculated from the deviation (positional deviation) and a steering angle calculated from the bearing (bearing deviation), the automatic-steering control unit 40a may define an ultimate steering angle in the automatic steering.

The defining method is not limited to the example described above so long as the automatic-steering control unit 40a can define the steering angle in the automatic steering. The following description mainly relates to a case where the travel information of the vehicle body 3 is bearing information, the reference line L1 and the planned travel line L2 are defined based on the bearings of the lines, and the automatic-steering control unit 40a defines the steering angle to set the angle θg to zero (to align the vehicle-body bearing F with the bearing of the planned travel line L2).

As illustrated in FIG. 1, the working vehicle 1 includes a mode changing switch (second operation actuator) 25 and a steering changeover switch 26. The mode changing switch 25 is an operable switch operation actuator that receives an operation and that is used for enabling or disabling the automatic steering, and is, for example, a push button switch. The mode changing switch 25 is connected to the controller 40 and can output an operation signal to the controller 40. The operator operates the mode changing switch 25 when enabling or disabling the automatic steering. When the mode changing switch 25 is turned on, the controller 40 enables the automatic steering and allows the automatic-steering control unit 40a to perform the automatic steering. When the mode changing switch 25 is turned off, the controller 40 disables the automatic steering and restricts the automatic steering by the automatic-steering control unit 40a.

The steering changeover switch 26 is an operable switch used for starting the automatic steering (setting the automatic steering) and for terminating the automatic steering (canceling the automatic steering). In this preferred embodiment, the steering changeover switch 26 is a tiltable lever switch. The steering changeover switch 26 is connected to the controller 40 and can output an operation signal to the controller 40.

When the automatic steering is enabled, that is, when the mode changing switch 25 is turned on, the automatic-steering control unit 40a performs control for starting or terminating the automatic steering based on an operation performed on the steering changeover switch 26. In this preferred embodiment, the operator operates the steering changeover switch 26 (for starting the automatic steering) when causing the working vehicle 1 to perform the automatic steering. The steering changeover switch 26 can be used for canceling the automatic steering by being operated (for terminating the automatic steering) in a state where the automatic-steering control unit 40a is performing the automatic steering.

As illustrated in FIG. 1, the controller 40 includes a line defining unit 40b. The line defining unit 40b includes electric and electronic component(s) provided in the controller 40 and/or program(s) installed in the memory unit 41. In a case where the automatic steering is enabled, that is, in a case where the mode changing switch 25 is turned on, the line defining unit 40b defines the reference line L1 based on travel information (e.g., bearing information) of the vehicle body 3 when the vehicle body 3 is performing the manual steering. When the vehicle body 3 is performing the manual steering, the line defining unit 40b defines a predetermined start point Ps and a predetermined goal point Pg so as to define bearing information of a line extending through the start point Ps and the goal point Pg as the reference line L1. In other words, the line defining unit defines a bearing indicating the reference line L1. The line defining unit 40b stores the defined reference line L1 in the memory unit 41.

If the travel information is positional information about the vehicle-body position P, the line defining unit 40b defines positional information of a line extending through the start point Ps and the goal point Pg as the reference line L1.

As illustrated in FIG. 1, the working vehicle 1 includes a registration switch 27. The line defining unit 40b acquires the start point Ps and the goal point Pg of the reference line L1 in an agricultural field G and defines the reference line L1 based on the acquired start point Ps and goal point Pg.

The registration switch 27 is an operable switch operation actuator and is, for example, a push button switch. The registration switch 27 may be operable by using an operation lever shared with the steering changeover switch 26. The registration switch 27 is connected to the controller 40 and can output an operation signal to the controller 40. The operator operates the registration switch 27 when defining the reference line L1. The line defining unit 40b can define the start point Ps and the goal point Pg based on an operation performed on the registration switch 27.

In detail, if the travel information is bearing information, the line defining unit 40b acquires bearing information of the vehicle body 3 at the start point Ps and the goal point Pg from the bearing (bearing information) of the working vehicle 1 when the registration switch 27 is operated. The line defining unit 40b calculates, for example, an average of the bearing at the start point Ps and the bearing at the goal point Pg and registers the bearing of the reference line L1, thus defining the reference line L1.

If the travel information is positional information, the line defining unit 40b acquires the start point Ps and the goal point Pg from the position (vehicle-body position P) of the working vehicle 1 when the registration switch 27 is operated, and registers the acquired start point Ps and goal point Pg, thus defining the reference line L1.

Figure 4:
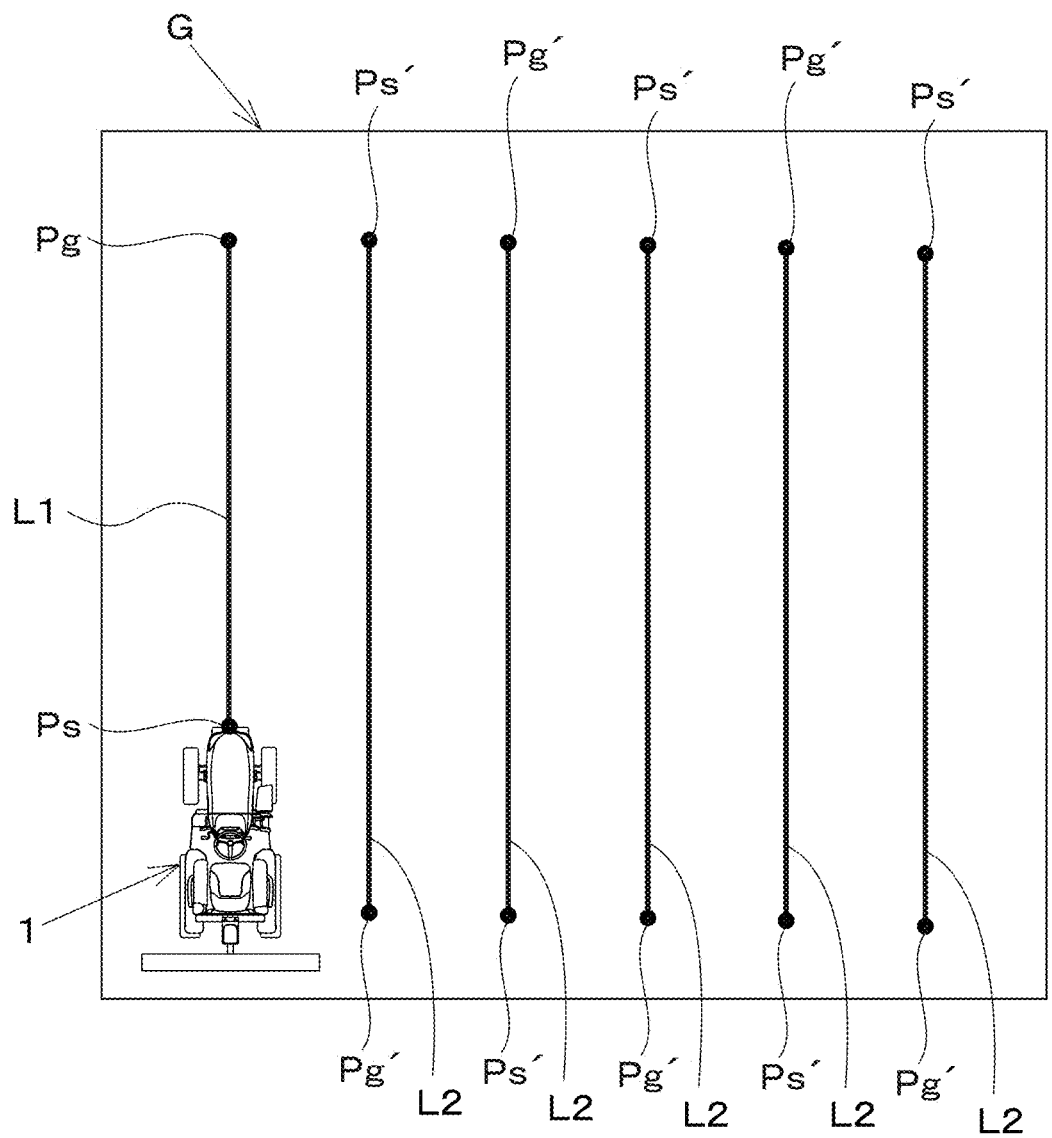
FIG. 4 illustrates a reference line and planned travel lines.

As illustrated in FIG. 4, the line defining unit 40b can define the planned travel line L2 extending parallel to the reference line L1 based on the reference line L1 stored in the memory unit 41. The line defining unit 40b defines the planned travel line L2 in accordance with an operation performed on the steering changeover switch 26.

If the travel information is bearing information and the reference line L1 is defined based on the bearing of the reference line L1, when the operator operates the steering changeover switch 26 (for starting the automatic steering) in a state where the reference line L1 is stored in the memory unit 41, the line defining unit 40b defines the planned travel line L2 indicating the same bearing as the bearing of the reference line L1 based on the bearing of the reference line L1 with reference to a current vehicle-body position P (start point Ps') where the steering changeover switch 26 is operated. A goal point Pg' for the planned travel line L2 is a position where the steering changeover switch 26 is operated (for terminating the automatic steering).

If the travel information is positional information and the reference line L1 is defined based on the positional information at the start point Ps and the goal point Pg, when the operator operates the steering changeover switch 26 (for starting the automatic steering) in a state where the reference line L1 is stored in the memory unit 41, the line defining unit 40b acquires a current vehicle-body position P where the steering changeover switch 26 is operated. The line defining unit 40b sets the current vehicle-body position P as a start point Ps' and defines the planned travel line L2 by parallel-shifting the reference line L1 based on the start point Ps' and the start point Ps for the reference line L1.

The controller 40 may be capable of transmitting the reference line L1 defined by the line defining unit 40b to the server 50, to be described below, via the communicator 42. Furthermore, if the line defining unit 40b can acquire the reference line L1 from the outside, the line defining unit 40b may be incapable of defining the reference line L1 so long as the line defining unit 40b can define the planned travel line L2 based on the reference line L1 stored in the memory unit 41. The communicator 42 can receive, from the server 50, a replacement line L4 for replacing the reference line L1 of the controller 40.

The server 50 is a stationary terminal, such as a stationary computer, provided outside the working vehicle 1. Furthermore, the server 50 is, for example, a stationary terminal set in a farming household, a farming company, an agricultural machine manufacturer, or an agricultural cooperative association. The server 50 transmits a replacement line L4 to the communicator 42. In this preferred embodiment, the server 50 can receive a reference line L1 transmitted from the communicator 42 and store the reference line L1. The server 50 can store a plurality of reference lines L1.

The source from which a reference line L1 is acquired is not limited to the working vehicle 1 so long as the server 50 can store the reference line L1. For example, in addition to or in place of the reference line L1 transmitted from the communicator 42, the server 50 may store a reference line L1 defined via a terminal connected to the server 50 in a communicable manner or may acquire a reference line L1 stored in a storage medium and store the reference line L1 in a database 53.

As illustrated in FIG. 1, the server 50 includes a server controller 51, a server communicator 52, and the database 53. The server controller 51 performs various types of control related to the server 50 and can store (register), for example, information received by the server communicator 52 in the database 53. The server controller 51 includes electric and electronic component(s) and/or program(s).

For example, the server communicator 52 is communicable with the communicator 42 of the working vehicle 1 and with the management terminal 60 and the portable terminal 70, to be described below. The server communicator 52 performs wireless communication by using a data communication network or a portable telephone communication network. Alternatively, the server communicator 52 may perform wireless communication by using, for example, Bluetooth (registered trademark) Low Energy in the Bluetooth (registered trademark) specification of the communication standard IEEE 802.15.1 series or WiFi (registered trademark) of the communication standard IEEE 802.11.n series, so long as the server communicator 52 is communicable with, for example, the working vehicle 1 (communicator 42), the management terminal 60, and the portable terminal 70.

The database 53 is, for example, a nonvolatile memory that can store various programs and various types of information. In detail, the database 53 can store a reference line L1. Specifically, the database 53 registers a reference line L1, management information as identification information for the reference line L1, and work information in association with one another. The management information is indicated with text and alphanumeric characters and is set for facilitating, for example, the calculation, search, and organization of the reference line L1.

The work information is related to the work of the working vehicle 1 when the vehicle body 3 performs the manual steering, that is, when the line defining unit 40b defines a reference line L1. The work information includes at least one piece of information from among, for example, the agricultural field G where the working vehicle 1 performs the work, the positional information of the agricultural field G (e.g., the positional information of the outline of the agricultural field G), the information about the working vehicle 1, the information about the working device 2 used in the work by the working vehicle 1, the work content of the working device 2, and the crop to be produced in the agricultural field G.

Therefore, the server communicator 52 can extract a reference line L1 stored in the database 53 and transmit the reference line L1 as a replacement line L4 to the communicator 42.

If the controller 40 is configured or programmed to correct a reference line L1 or if a reference line L1 is to be corrected via, for example, a terminal connected in a communicable manner to the server 50, the server 50 may be configured to correct (overwrite) a reference line L1 stored in the database 53 based on the correction.

The management terminal 60 is a terminal, such as a smartphone (multifunctional portable telephone), a tablet, or a personal digital assistant (PDA), or a stationary computer, such as a personal computer. In this preferred embodiment, the management terminal 60 is described as being a terminal, such as a smartphone. The management terminal 60 is operated by a manager who creates a work plan for the agricultural field G or by a relatively experienced operator. The management terminal 60 includes a first terminal controller 61, a first terminal communicator 62, a first terminal memory unit 63, and a first terminal display unit 64. The first terminal controller 61 performs various types of control related to the management terminal 60 and can cause, for example, the first terminal display unit 64 to display various types of information by controlling the first terminal display unit 64. The first terminal controller 61 includes electric and electronic component(s) and/or program(s).

The first terminal communicator 62 is communicable with the server 50 (server communicator 52). The first terminal communicator 62 performs wireless communication by using a data communication network or a portable telephone communication network. Alternatively, the first terminal communicator 62 may perform wireless communication by using, for example, Bluetooth (registered trademark) Low Energy in the Bluetooth (registered trademark) specification of the communication standard IEEE 802.15.1 series or WiFi (registered trademark) of the communication standard IEEE 802.11.n series, so long as the first terminal communicator 62 is communicable with, for example, the server communicator 52.

The first terminal memory unit 63 is a nonvolatile memory that can store various types of information. The first terminal memory unit 63 can store various types of information related to the management terminal 60.

The first terminal display unit 64 can display various types of information stored in the first terminal memory unit 63 as well as information received by the first terminal communicator 62. The first terminal display unit 64 can display, for example, each of screens illustrated in FIG. 6 to FIG. 10. The first terminal display unit 64 may be an input device that can receive an input of information. In this case, the first terminal display unit 64 is of a touchscreen type that receives an input of information in response to an operation performed by the operator by using a finger. The first terminal display unit 64 may be of a non-touchscreen type. In this case, the management terminal 60 includes various switches and can receive an input of information based on an operation performed on any of the switches.

The management terminal 60 can receive selection of any reference line L1 from reference lines L1 stored in the server 50. In detail, the management terminal 60 registers the selected reference line L1 as a candidate (candidate line L3) for a replacement line L4. The first terminal display unit 64 is capable of displaying (presenting) at least one reference line L1 of the reference lines L1 stored in the server 50.

As illustrated in FIG. 1, the management terminal 60 includes a management defining unit 61a that receives selection of a reference line L1 displayed on the first terminal display unit 64 and that directly or indirectly defines a candidate line L3. The management defining unit 61a receives selection of any reference line L1 from reference lines L1 displayed on the first terminal display unit 64 as a candidate (candidate line L3) for a reference line L1 to be used as reference for the automatic steering by the working vehicle 1. The management defining unit 61a includes electric and electronic component(s) provided in the first terminal controller 61 and/or program(s) installed in the first terminal memory unit 63.

In this preferred embodiment, the management defining unit 61a receives selection of any reference line L1 from the reference lines L1 and transmits the selected information (selection information) to the server 50 via the first terminal communicator 62 and the server communicator 52. When the server 50 receives the selection information, the server 50 defines the candidate line L3 based on the selection information. In other words, in this preferred embodiment, the management terminal 60 (management defining unit 61a) receives selection of any reference line L1 so as to indirectly define the candidate line L3.

As illustrated in FIG. 1, the server 50 includes a first presenting unit 51a and a first setting unit 51b. The first presenting unit 51a and the first setting unit 51b are provided in the server controller 51 and each include electric and electronic component(s) provided in the server controller 51 and/or program(s) installed in the server controller 51.

The first presenting unit 51a transmits the reference lines L1 stored in the server to the management terminal 60 and causes the first terminal display unit 64 to display the reference lines L1 indirectly via the first terminal controller 61.

The first setting unit 51b registers (sets) the reference line L1 corresponding to the selection information transmitted from the management defining unit 61a as the candidate line L3 from among the reference lines L1 stored in the server 50. In detail, the first setting unit 51b rewrites information corresponding to the selected reference line L1 so as to register the reference line L1 as the candidate line L3. Specifically, the first setting unit 51b adds or rewrites an arbitrary text string to management information allocated to the reference line L1 so as to register the reference line L1 as the candidate line L3.

Figure 5A:
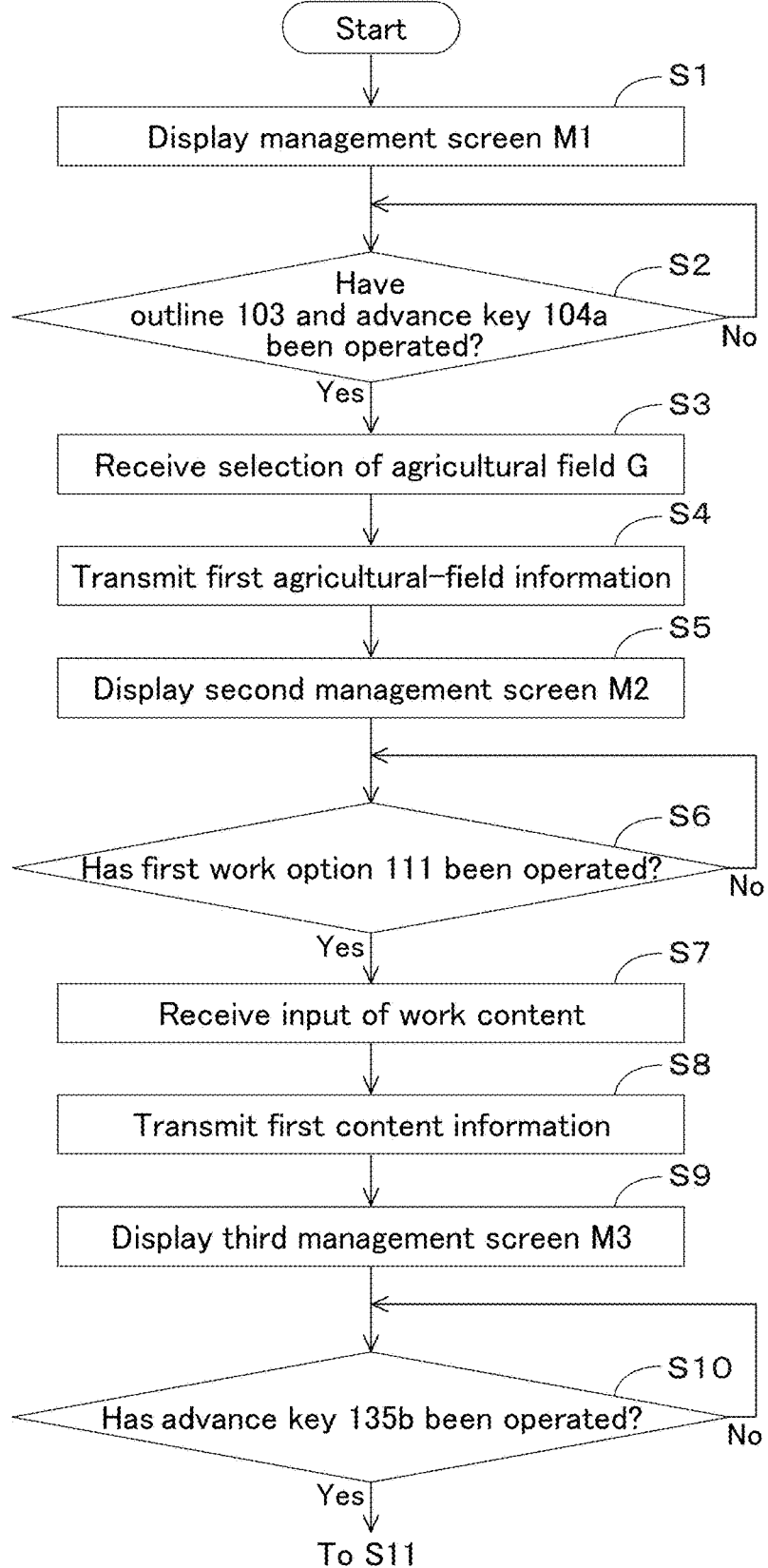
FIG. 5A is a diagram explaining the definition of a candidate line and the transition of a screen displayed by a first terminal display unit.
Figure 5B:
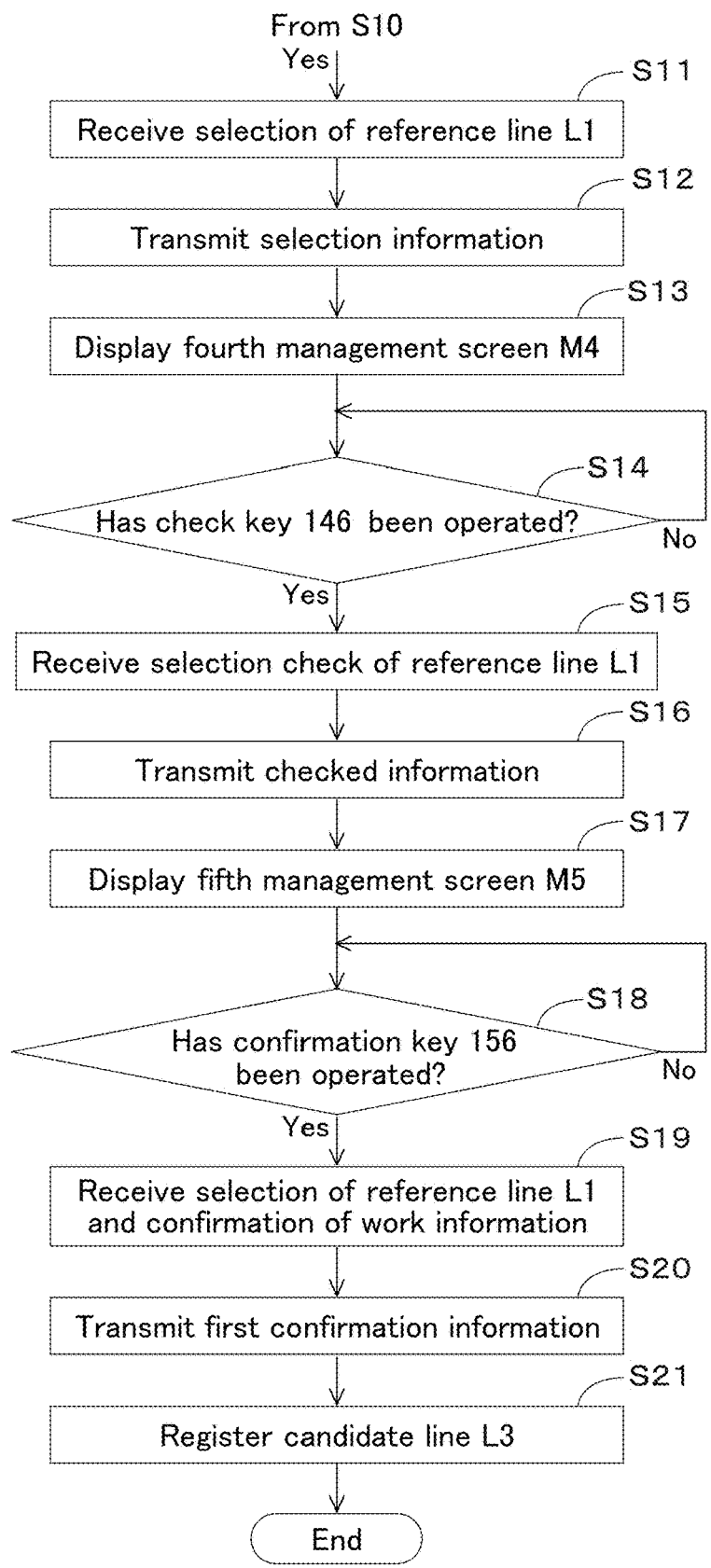
FIG. 5B is a diagram explaining the definition of the candidate line and the transition of the screen displayed by the first terminal display unit.
Figure 6:
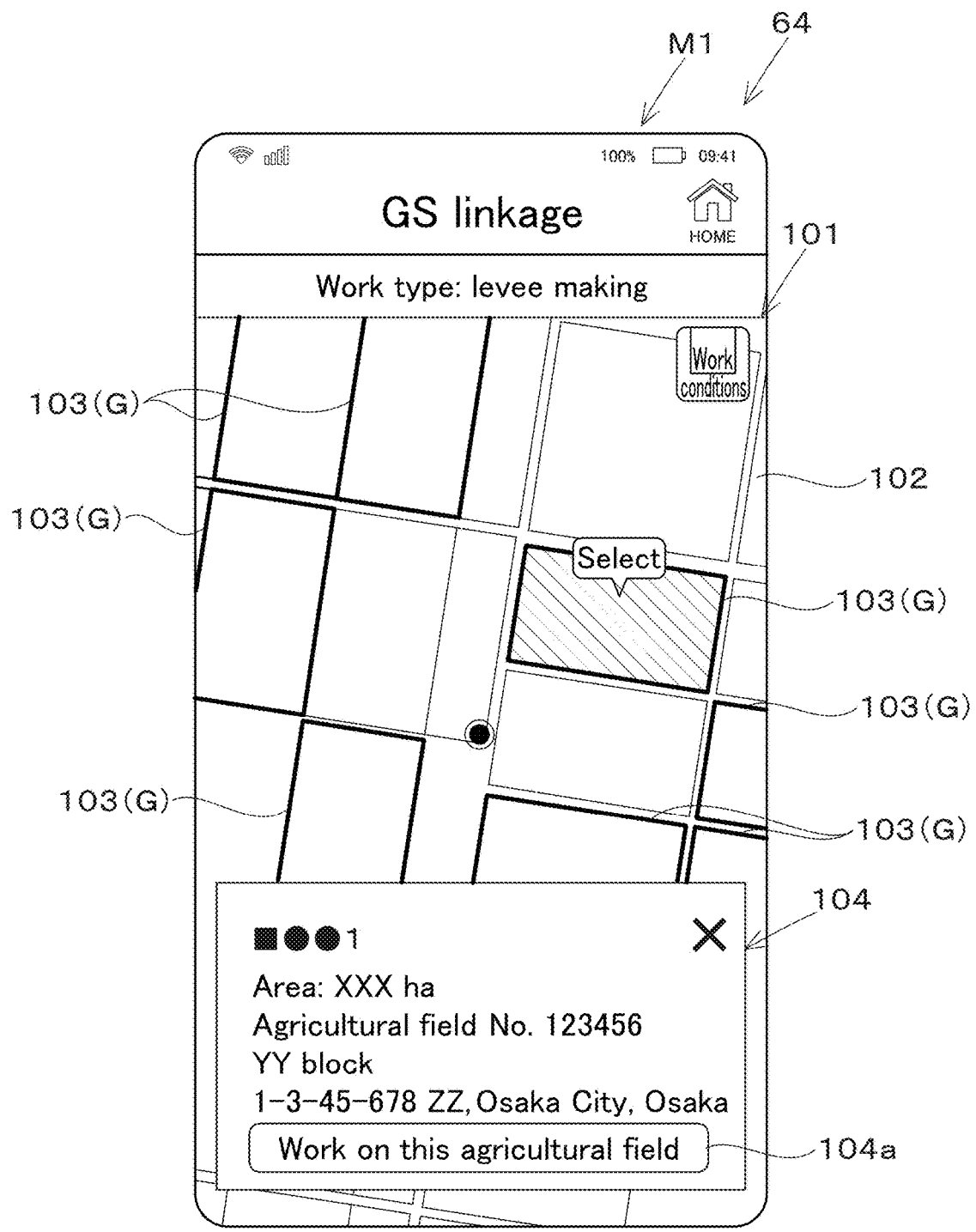
FIG. 6 illustrates a first management screen.
Figure 7:
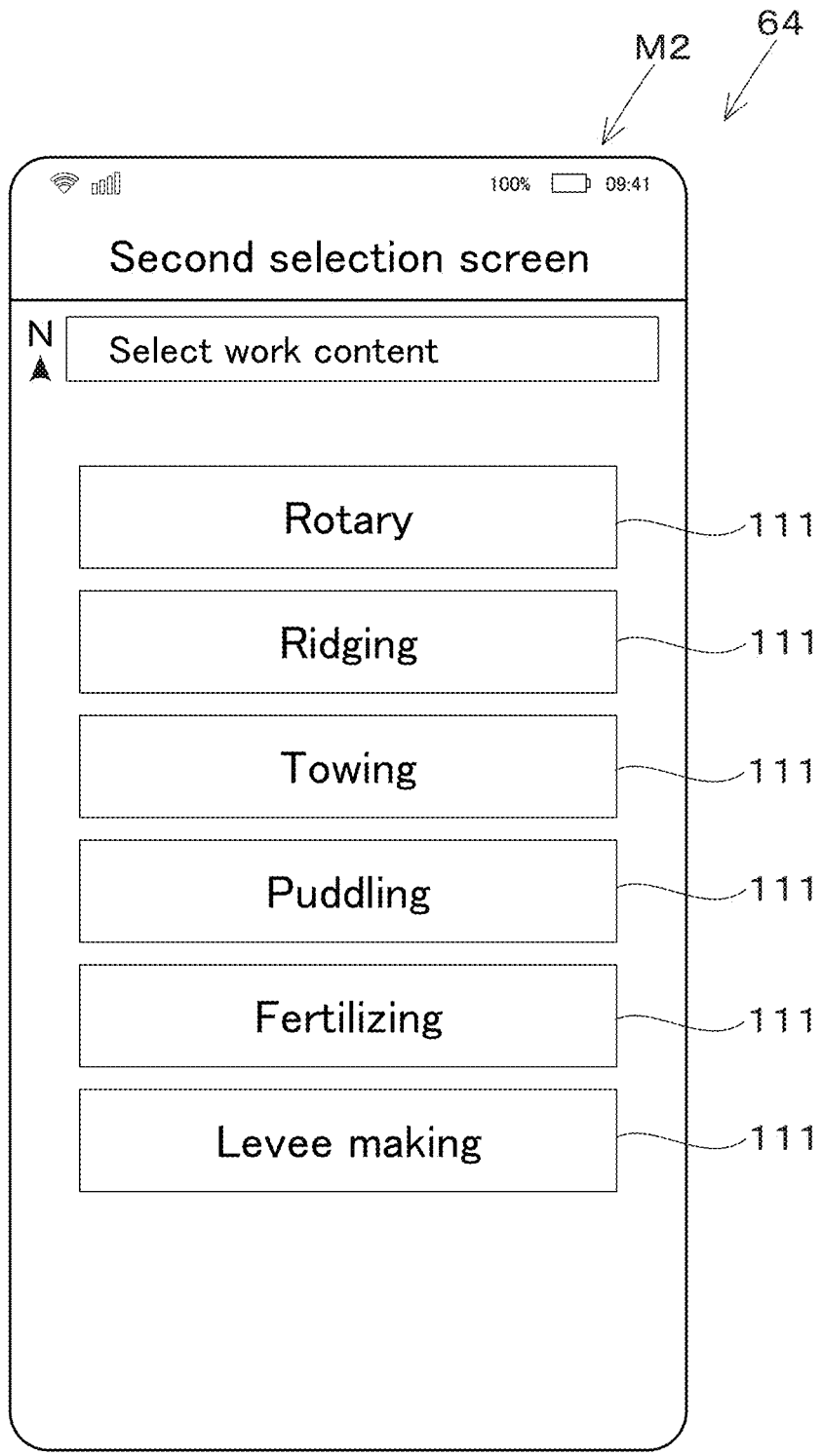
FIG. 7 illustrates a second management screen.

The flow for defining a candidate line L3 and the screen transition on the first terminal display unit 64 will be described below with reference to FIG. 5A to FIG. 10. As illustrated in FIGS. 5A and 5B, when the operator performs a predetermined operation on the management terminal 60, the first presenting unit 51a causes the first terminal display unit 64 to display a screen on which work information is selectable, as illustrated in FIG. 6 and FIG. 7, and the management defining unit 61a receives an input of the work information. In detail, as illustrated in FIG. 5A, when the operator performs a predetermined operation on the management terminal 60, the first presenting unit 51a causes the first terminal display unit 64 to display a first management screen M1 on which an agricultural field G is selectable as work information in step S1.

As illustrated in FIG. 6, the first management screen M1 includes a first map screen 101 that displays a plurality of agricultural fields (fields) G. The first map screen 101 displays a bird's-eye-view map 102, outlines 103 of the agricultural fields G displayed on the map 102, and an agricultural-field information section 104 displaying information about an agricultural field G.

Each of the outlines 103 of the agricultural fields G is a display image that is temporarily selectable in response to an operation performed on the management terminal 60. The agricultural-field information section 104 displays information about a temporarily selected agricultural field G (including the surface area, management number, and address of the agricultural field G). The agricultural-field information section 104 includes an operable advance key 104a. The advance key 104a is an operable display image. The management defining unit 61a receives an operation performed on the advance key 104a so as to confirm that the agricultural field G corresponding to the temporarily selected outline 103 is selected.

As illustrated in FIG. 5A, when any outline 103 is operated from among the outlines 103 of the agricultural fields G on the first map screen 101 and the advance key 104a is operated (Yes in step S2), the management defining unit 61a acquires an operation signal of the outline 103 and receives selection of the agricultural field G in step S3. When the management defining unit 61a receives the selection of the agricultural field G in step S3, the management defining unit 61a transmits, to the server 50, information (first agricultural-field information) for identifying the selected agricultural field G in step S4.

When the management defining unit 61a transmits the first agricultural-field information to the server 50 in step S4, the first presenting unit 51a may cause the first terminal display unit 64 to display a screen to which another piece of work information is inputtable. In this preferred embodiment, as illustrated in FIG. 5A, the first presenting unit 51a causes the first terminal display unit 64 to display a second management screen M2 in step S5. The second management screen M2 is used for inputting the content (work content) of work to be performed by the working vehicle 1.

As illustrated in FIG. 7, the second management screen M2 displays a plurality of selectable (inputtable) first work options 111 indicating different work contents. The first work options 111 are a plurality of selectable display images displayed on the second management screen M2. The first work options 111 are respectively associated with different work contents. In this preferred embodiment, as illustrated in FIG. 7, the first work options 111 displayed on the second management screen M2 correspond to "rotary (cultivating)", "ridging", "towing", "puddling", "fertilizing", and "levee making".

As illustrated in FIG. 5A, when any first work option 111 of the first work options 111 displayed on the second management screen M2 is operated (Yes in step S6), the management defining unit 61a acquires an operation signal of the first work option 111 and receives an input of the work content associated with the first work option 111 in step S7. When the management defining unit 61a receives the input of the work content in step S7, the management defining unit 61a transmits information (first content information) for identifying the input work content to the server 50 in step S8.

As illustrated in FIG. 5A, when the management defining unit 61a transmits the first content information to the server 50 in step S8, the first presenting unit 51a extracts a reference line L1 corresponding to the work information (first agricultural-field information and first content information) received by the management defining unit 61a from the reference lines L1 stored in the database 53, and causes the first terminal display unit 64 to display a third management screen M3 based on presented information of the reference line L1 in step S9.

Figure 8:
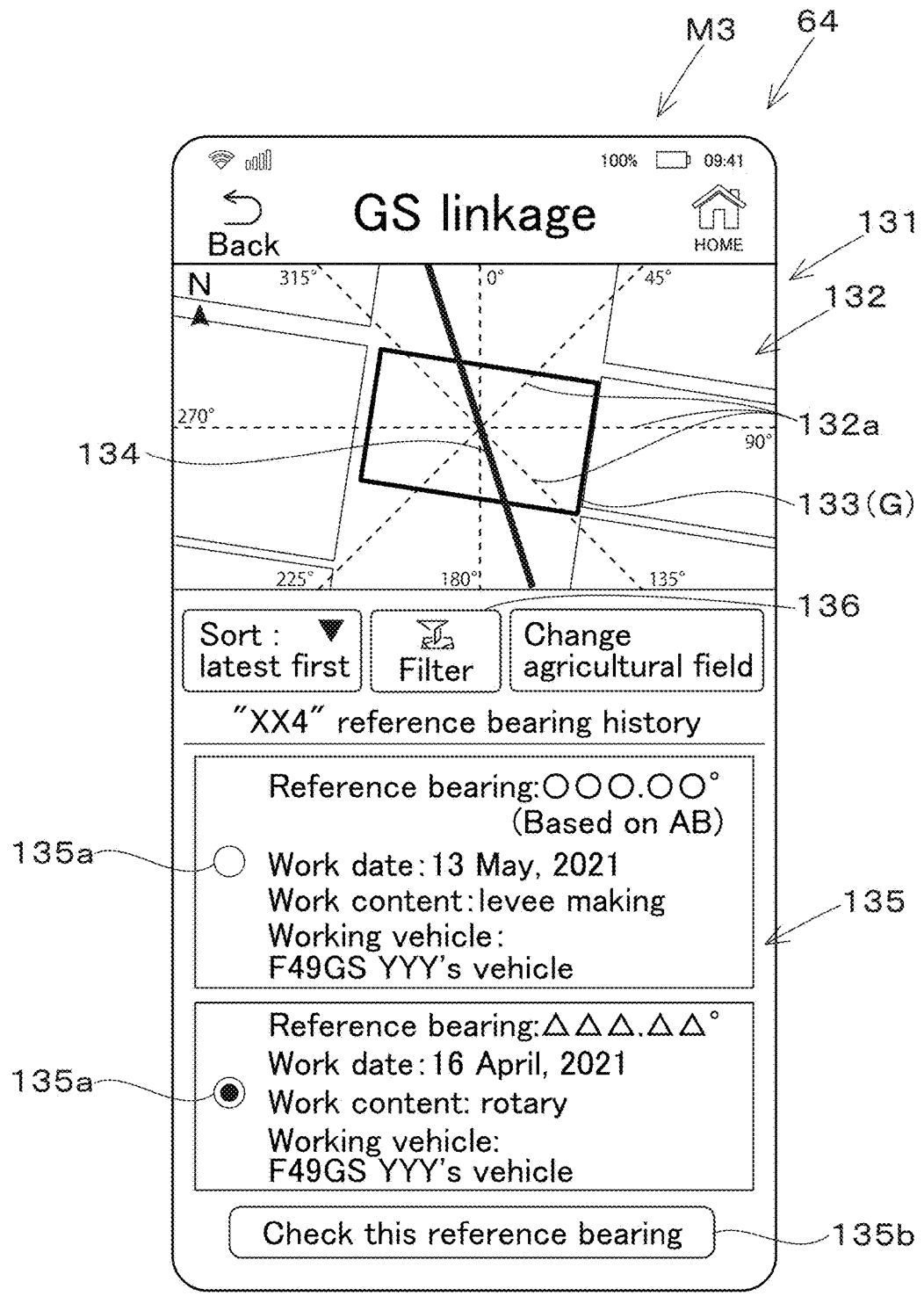
FIG. 8 illustrates a third management screen.

As illustrated in FIG. 8, the third management screen M3 includes a second map screen 131 displaying an agricultural field (field) G and a candidate list 135. The second map screen 131 displays a bird's-eye-view map 132, a bearing guide section 132a displayed on the map 132, an outline 133 of the agricultural field G, and a first imaginary line 134.

The first imaginary line 134 is the reference line L1 corresponding to the input work information received by the management defining unit 61a among the reference lines L1 stored in the database 53, and is displayed on the agricultural field (field) G. In detail, the first imaginary line 134 is the reference line L1 corresponding to the input work information (first agricultural-field information and first content information) received by the management defining unit 61a.

The candidate list 135 displays a list of reference lines L1 corresponding to the input work information received by the management defining unit 61a. The candidate list 135 displays the bearing of each reference line L1, the management information, and the work information.

In the candidate list 135, a select key 135a is disposed near (e.g., to the left of) each reference line L1. Each select key 135a is an operable display image and is associated with the corresponding reference line L1 (first imaginary line 134).

Each select key 135a can be used for selecting the associated reference line L1 by being operated. The management defining unit 61a acquires an operation signal of the relevant select key 135a and can update the first imaginary line 134 (reference line L1) displayed on the second map screen 131 of the third management screen M3.

The candidate list 135 also includes an advance key 135b. The advance key 135b is an operable display image, and the management defining unit 61a receives an operation (selection) performed on the advance key 135b. The management defining unit 61a receives an operation performed on the advance key 135b so as to receive selection of the reference line L1 corresponding to the first imaginary line 134 (first imaginary line 134 corresponding to the operated select key 135a) displayed on the second map screen 131.

The third management screen M3 may include a refine section 136 to be selected for refining first imaginary lines 134 to be displayed in the candidate list 135.

As illustrated in FIGS. 5A and 5B, when the operator selects the advance key 135b (Yes in step S10), the management defining unit 61a acquires information about the first imaginary line 134 corresponding to the selected select key 135a and receives selection of the reference line L1 corresponding to the first imaginary line 134 in step S11. The management defining unit 61a transmits selection information of the selected reference line L1 to the server 50 in step S12.

When the management defining unit 61a transmits the selection information to the server 50 in step S12, the first presenting unit 51a causes the first terminal display unit 64 to display a fourth management screen M4 for checking the selected reference line L1 received by the management defining unit 61a from among the reference lines L1 stored in the database 53 in step S13.

Figure 9:
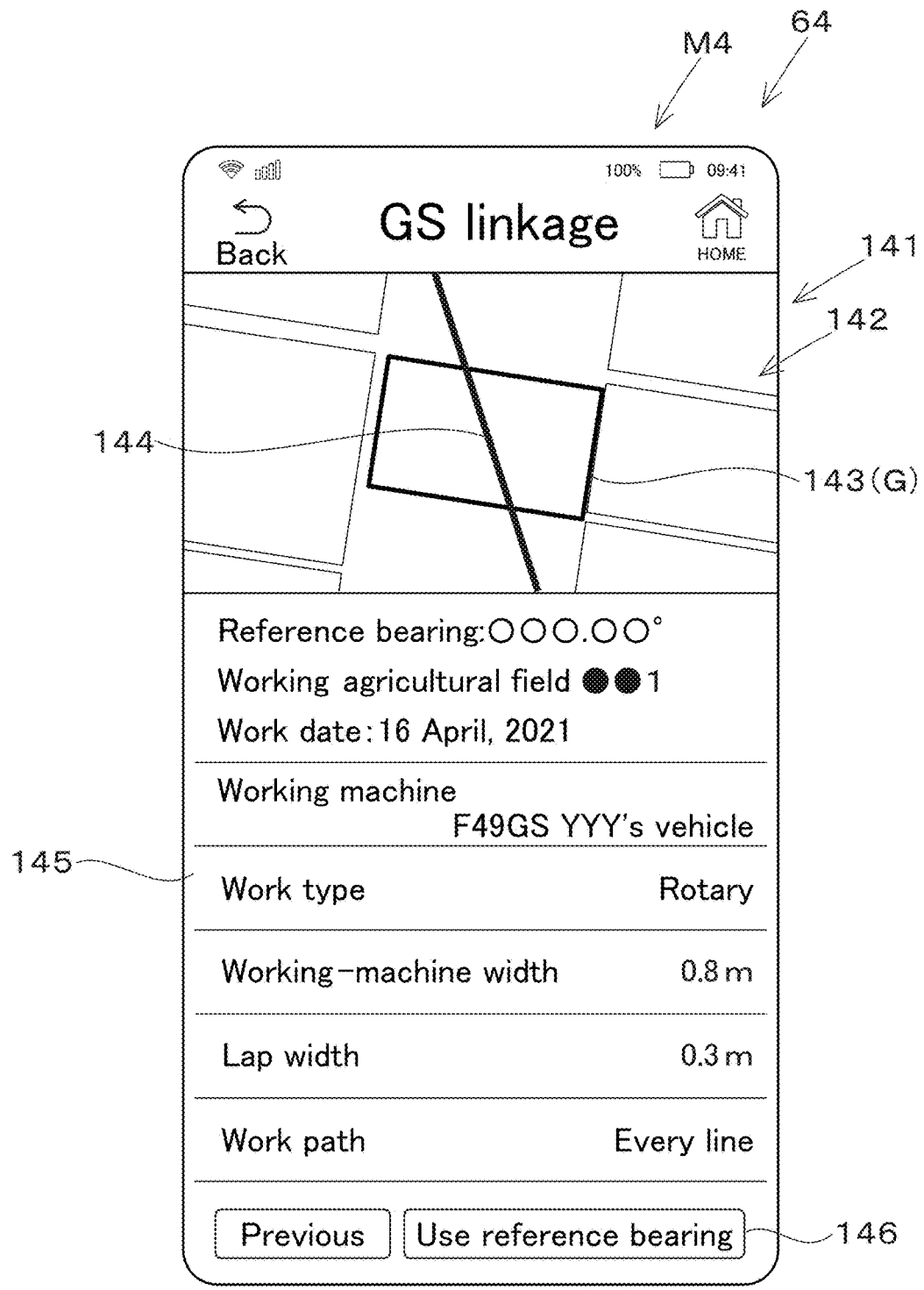
FIG. 9 illustrates a fourth management screen.

As illustrated in FIG. 9, the fourth management screen M4 includes a third map screen 141 displaying an agricultural field (field) G, a first details display section 145, and a check key 146. The third map screen 141 displays a bird's-eye-view map 142, and an outline 143 of the agricultural field G and a second imaginary line 144 that are displayed on the map 142.

As illustrated in FIG. 9, the second imaginary line 144 is any selected reference line L1 received by the management defining unit 61a and is displayed on the agricultural field (field) G.

The first details display section 145 is an area that displays information about the selected reference line L1 received by the management defining unit 61a. The first details display section 145 displays work information stored in the database 53 in association with the reference line L1. The check key 146 is an operable display image. The check key 146 is operated for checking the selection of the reference line L1 displayed on the fourth management screen M4.

Therefore, as illustrated in FIG. 5B, when the check key 146 is operated (Yes in step S14), the management defining unit 61*a* acquires an operation signal of the check key 146 and receives a selection check of the reference line L1 in step S15. The management defining unit 61*a* transmits checked information about the selection-checked reference line L1 to the server 50 in step S16.

When the management defining unit 61*a* transmits the checked information to the server 50 in step S16, the first presenting unit 51*a* causes the first terminal display unit 64 to display a fifth management screen M5 for confirming the selection-checked reference line L1 received by the management defining unit 61*a* and the work information in step S17.

Figure 10:
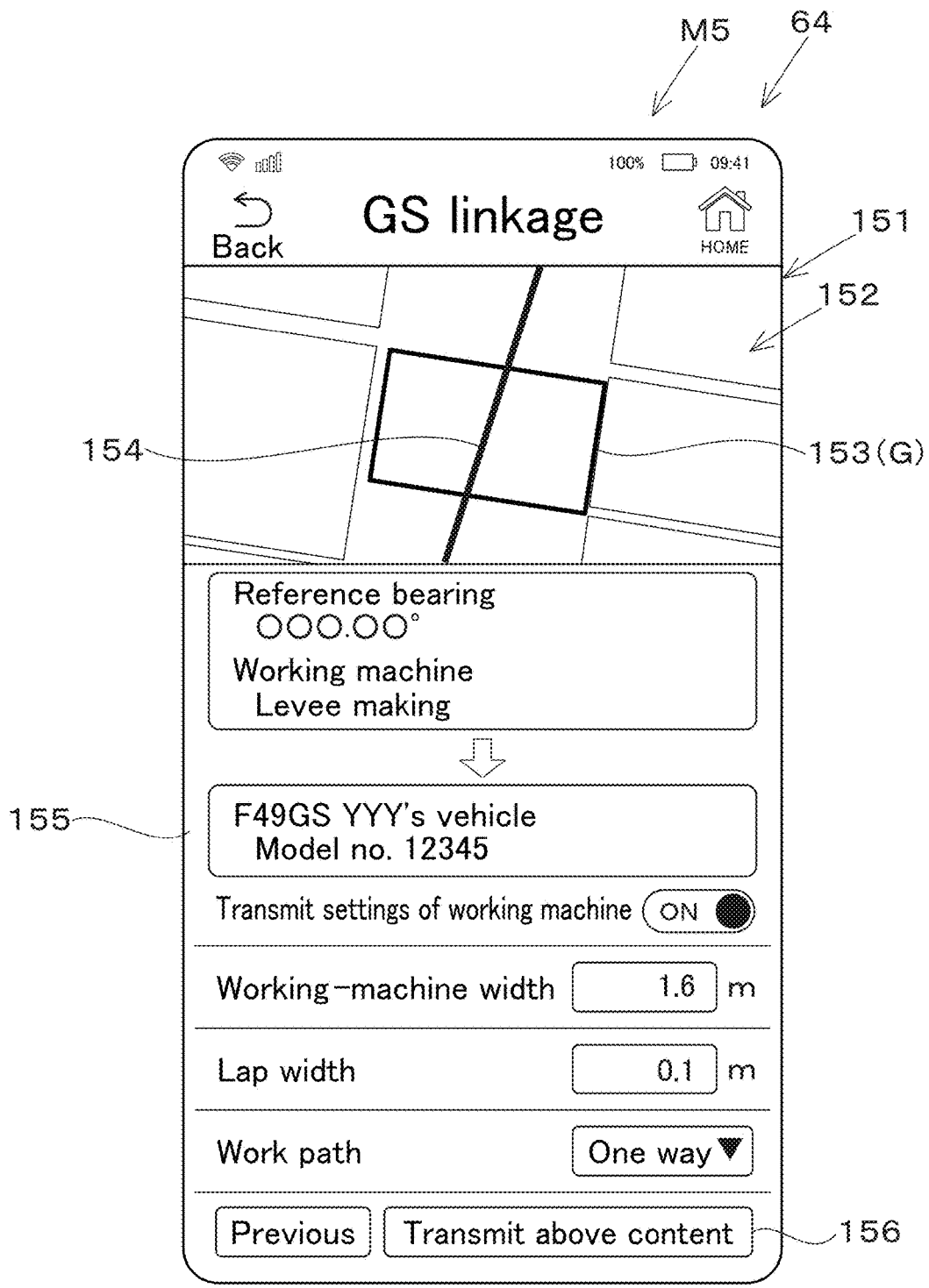
FIG. 10 illustrates a fifth management screen.

As illustrated in FIG. 10, the fifth management screen M5 includes a fourth map screen 151 displaying an agricultural field (field) G, a first details input section 155, and a confirmation key 156. The fourth map screen 151 displays a bird's-eye-view map 152, and an outline 153 of the agricultural field G and a third imaginary line 154 that are displayed on the map 152.

As illustrated in FIG. 10, the third imaginary line 154 is any selection-checked reference line L1 received by the management defining unit 61*a* and is displayed on the agricultural field (field) G.

The first details input section 155 is an area where work information to be performed along the selection-checked reference line L1 received by the management defining unit 61*a* is inputtable. For example, a work width and a lap width are inputtable as the work information to the first details input section 155. The confirmation key 156 is to be operated for confirming the selection of the reference line L1 displayed on the fifth management screen M5 and for confirming the work information input to the first details input section 155.

Therefore, as illustrated in FIG. 5B, when the confirmation key 156 is operated (Yes in step S18), the management defining unit 61*a* acquires an operation signal of the confirmation key 156 and receives the selection of the reference line L1 and the confirmation of the work information in step S19. The management defining unit 61*a* transmits first confirmation information about the selection-confirmed reference line L1 and the work information to the server in step S20.

Accordingly, when the server 50 receives the first confirmation information about the reference line L1 in step S20, the first setting unit 51*b* registers (sets) the selection-confirmed reference line L1 received by the management defining unit 61*a* as a candidate line L3 from among the reference lines L1 stored in the database 53 in step S21.

The portable terminal 70 is a terminal, such as a smartphone (multifunctional portable telephone), a tablet, or a PDA, or a stationary computer, such as a personal computer. In this preferred embodiment, the portable terminal 70 is described as being a terminal, such as a smartphone. The portable terminal 70 is independent of the management terminal 60 and is operated by, for example, an operator actually performing work on the agricultural field G. The portable terminal 70 may be operated by a relatively inexperienced operator. The portable terminal 70 includes a second terminal controller 71, a second terminal communicator 72, a second terminal memory unit 73, and a second terminal display unit 74. The second terminal controller 71 performs various types of control related to the portable terminal 70 and can cause, for example, the second terminal display unit 74 to display various types of information by controlling the second terminal display unit 74. The second terminal controller 71 includes electric and electronic component(s) and/or program(s).

The second terminal communicator 72 is communicable with the server 50 (server communicator 52). The second terminal communicator 72 performs wireless communication by using a data communication network or a portable telephone communication network. Alternatively, the second terminal communicator 72 may perform wireless communication by using, for example, Bluetooth (registered trademark) Low Energy in the Bluetooth (registered trademark) specification of the communication standard IEEE 802.15.1 series or WiFi (registered trademark) of the communication standard IEEE 802.11.n series, so long as the second terminal communicator 72 is communicable with, for example, the server communicator 52.

The second terminal memory unit 73 is a nonvolatile memory that can store various types of information. The second terminal memory unit 73 can store various types of information related to the portable terminal 70.

The second terminal display unit 74 can display various types of information stored in the second terminal memory unit 73 as well as information received by the second terminal communicator 72. The second terminal display unit 74 can display, for example, each of screens illustrated in FIG. 12 to FIG. 14. The second terminal display unit 74 may be an input device that can receive an input of information. In this case, the second terminal display unit 74 is of a touchscreen type that receives an input of information in response to an operation performed by the operator by using a finger. The second terminal display unit 74 may be of a non-touchscreen type. In this case, the portable terminal 70 includes various switches and can receive an input of information based on an operation performed on any of the switches.

The portable terminal 70 can receive selection of a candidate line L3 registered by the management terminal 60 and command the server 50 to transmit the selected candidate line L3 as a replacement line L4 to the working vehicle 1. In detail, the portable terminal 70 receives an input of work information and extracts a candidate line L3 corresponding to the work information from the server 50, so as to receive selection of the candidate line L3.

Specifically, the portable terminal 70 includes a replacement defining unit 71*a* that receives a process for selecting a predetermined candidate line L3 as a replacement line L4 from candidate lines L3 stored in the database 53 and that directly or indirectly defines the replacement line L4. The replacement defining unit 71*a* receives an input of work information for selecting the predetermined candidate line L3 as the replacement line L4 in response to an operation from among the candidate lines L3 stored in the database 53. The replacement defining unit 71*a* acquires work information input to the second terminal display unit 74 so as to receive an input of the work information. The replacement defining unit 71*a* includes electric and electronic component(s) provided in the second terminal controller 71 and/or program(s) installed in the second terminal memory unit 73.

In this preferred embodiment, the replacement defining unit 71*a* transmits the received work information (input information) to the server 50. The server 50 extracts a candidate line L3 corresponding to the input information so as to select the candidate line L3. In other words, the portable terminal 70 receives an input of work information and causes the server 50 to extract a candidate line L3, so as to indirectly define the replacement line L4.

The portable terminal 70 includes a command unit 71*b*. The command unit 71*b* commands the server 50 to transmit a replacement line L4 to the communicator 42 in accordance with what operation is performed on the portable terminal

70. The command unit 71*b* includes electric and electronic component(s) provided in the second terminal controller 71 and/or program(s) installed in the second terminal memory unit 73. The command unit 71*b* commands the server 50 to transmit a replacement line L4 selected by the replacement defining unit 71*a* to the communicator 42.

As illustrated in FIG. 1, the server 50 includes a second presenting unit 51*c* and a second setting unit 51*d*. The second presenting unit 51*c* and the second setting unit 51*d* are provided in the server controller 51 and each include electric and electronic component(s) provided in the server controller 51 and/or program(s) installed in the server controller 51.

The second presenting unit 51*c* transmits the candidate lines L3 stored in the server to the portable terminal 70 and causes the second terminal display unit 74 to display the candidate lines L3.

The second setting unit 51*d* transmits, to the working vehicle 1, a selection-confirmed candidate line L3 received by the replacement defining unit 71*a* as a replacement line L4 from among the candidate lines L3 stored in the server 50. In detail, the second setting unit 51*d* transmits the replacement line L4 to the working vehicle 1 linked with the portable terminal via the server communicator 52 and the communicator 42.

The flow for receiving selection of a candidate line L3 by the replacement defining unit 71*a* and transmitting the candidate line L3 from the server 50 to the working vehicle 1 in response to a command from the command unit 71*b* and the screen transition on the second terminal display unit 74 will be described below with reference to FIG. 11 to FIG. 14.

Figure 11:
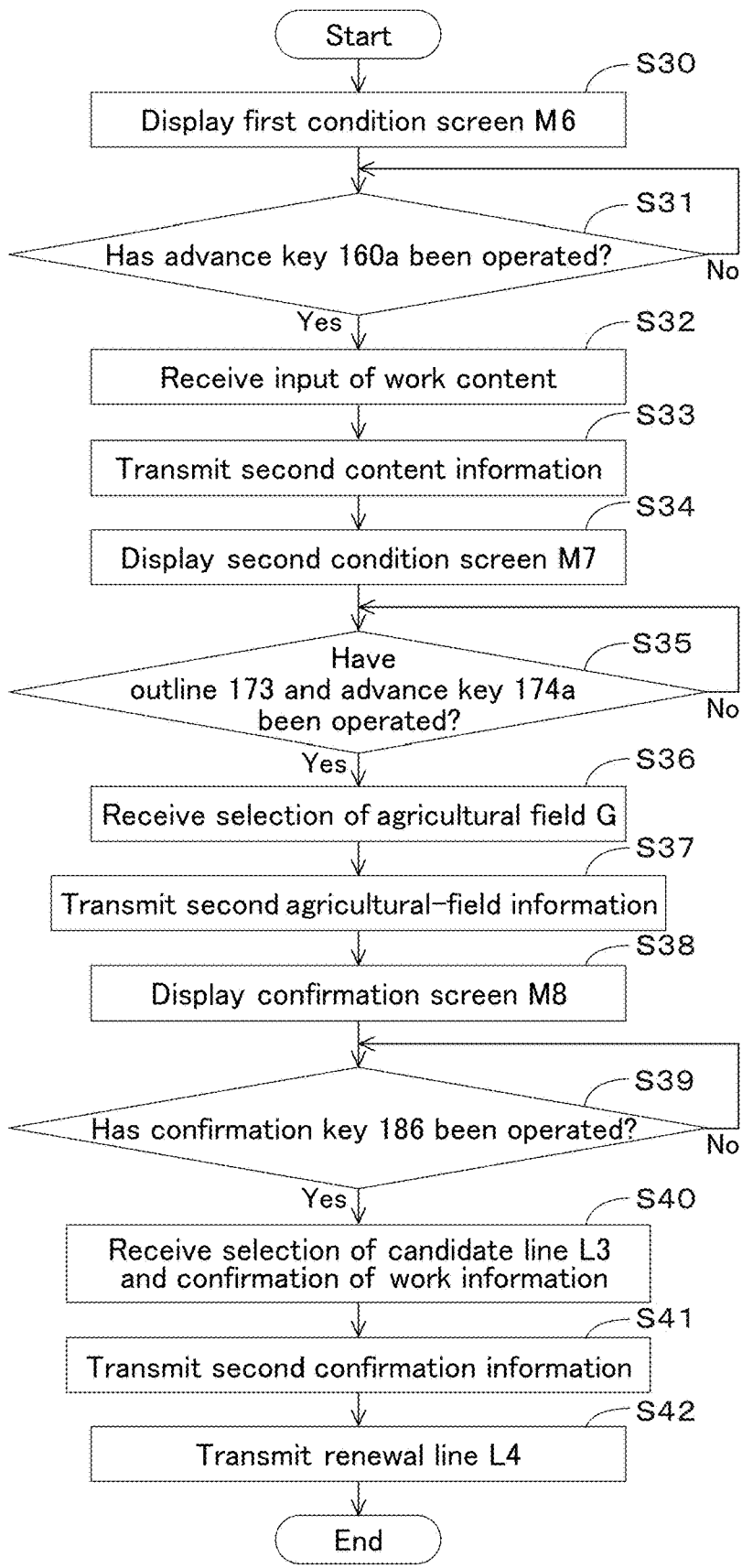
FIG. 11 illustrates the flow of a replacement line transmitted to the working vehicle and the transition of a screen displayed by a second terminal display unit.

As illustrated in FIG. 11, for example, when the operator performs a predetermined operation on the portable terminal 70, the second presenting unit 51*c* causes the second terminal display unit 74 to display a screen to which work information is inputtable. In detail, the second presenting unit 51*c* causes the second terminal display unit 74 to display a first condition screen M6 in step S30. The first condition screen M6 is a screen to which work information including information about the working vehicle 1, information about the working device 2 used in work by the working vehicle 1, and information about the work content of the working device 2 is inputtable.

Figure 12:
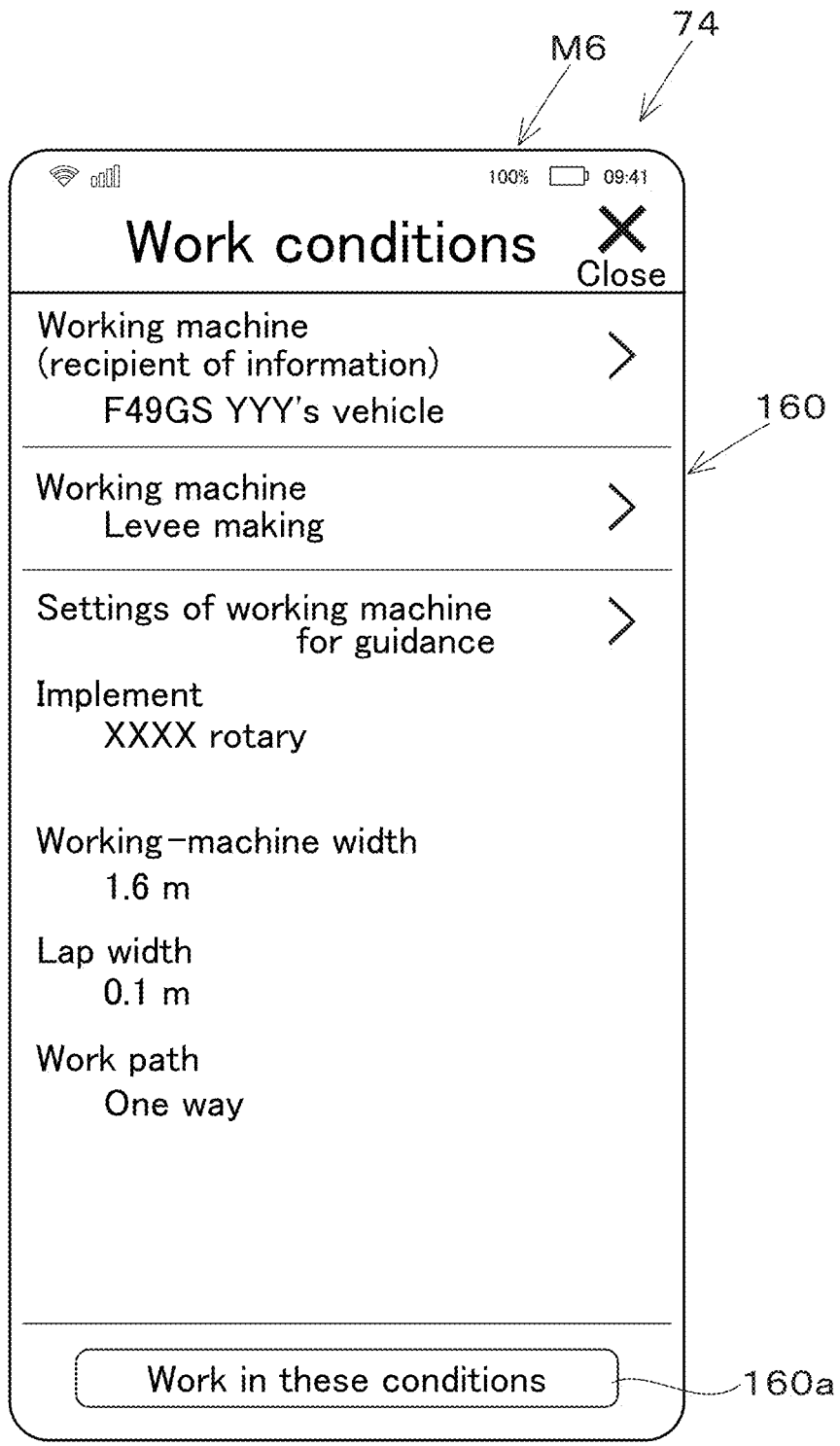
FIG. 12 illustrates a first condition screen.

As illustrated in FIG. 12, the first condition screen M6 displays a second details input section 160 to which work information is inputtable. The second details input section 160 is an area where items of the work information are selectable. The second details input section 160 also includes an advance key 160*a*. The advance key 160*a* is to be operated for confirming the work information input to the second details input section 160.

As illustrated in FIG. 11, when the work information is input to the second details input section 160 and the advance key 160*a* is operated (Yes in step S31), the replacement defining unit 71*a* acquires the work information input to the second details input section 160 and receives an input of the work content in step S32. The replacement defining unit 71*a* transmits information (second content information) for identifying the input work content to the server 50 in step S33.

When the replacement defining unit 71*a* transmits the second content information to the server 50 in step S33, the second presenting unit 51*c* may cause the second terminal display unit 74 to display a screen to which another piece of work information is inputtable. In this preferred embodiment, as illustrated in FIG. 11, in step S34, the second presenting unit 51*c* causes the first terminal display unit 64 to display a second condition screen M7 on which an agricultural field G is selectable as work information.

Figure 13:
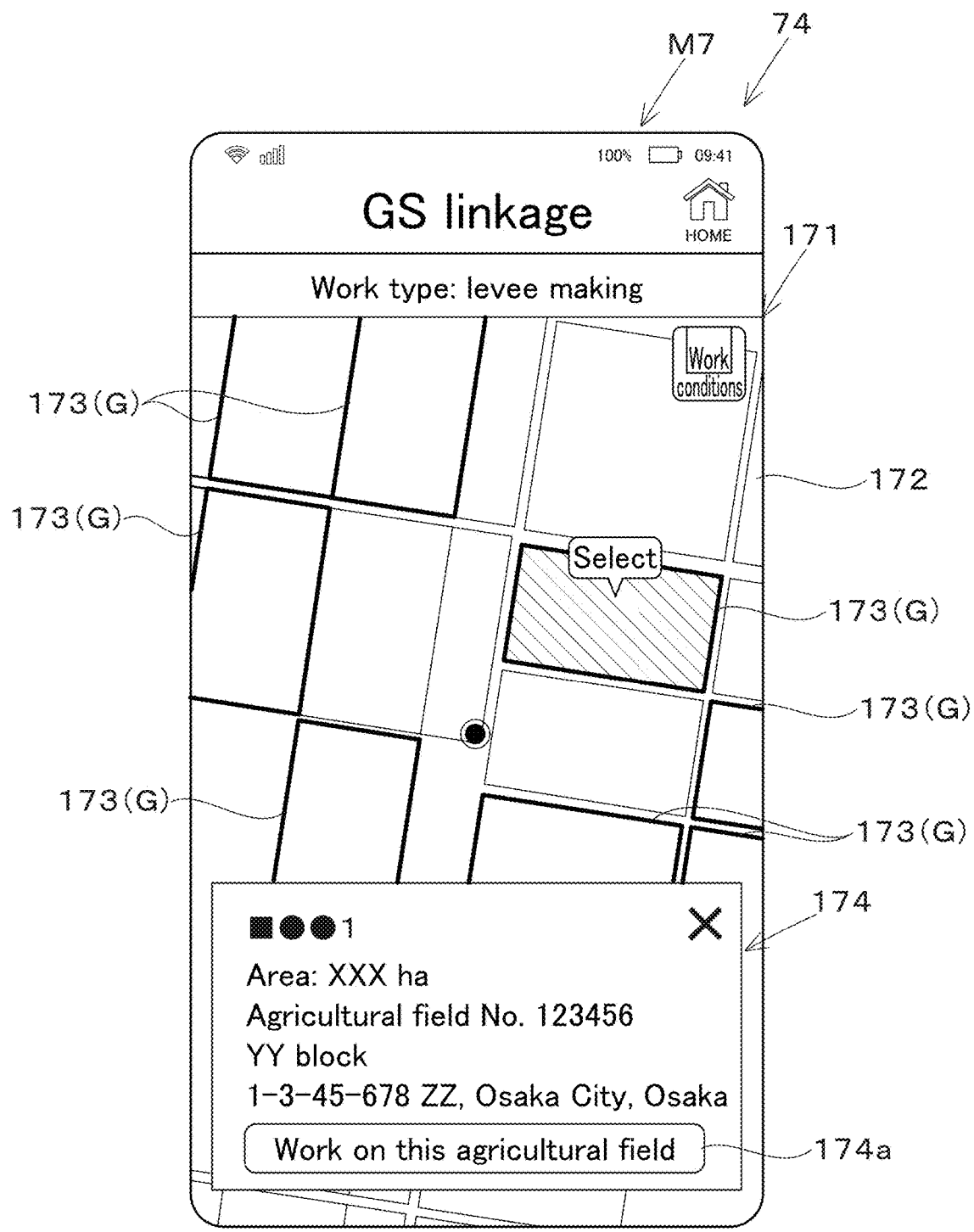
FIG. 13 illustrates a second condition screen.

The second condition screen M7 is used for selecting an agricultural field G where the working vehicle 1 performs work. As illustrated in FIG. 13, the second condition screen M7 includes a fifth map screen 171 displaying a plurality of agricultural fields (fields) G. The fifth map screen 171 displays a bird's-eye-view map 172, outlines 173 of the agricultural fields G displayed on the map 172, and an agricultural-field information section 174 displaying information about an agricultural field G.

Each of the outlines 173 of the agricultural fields G is a display image that is temporarily selectable in response to an operation performed on the portable terminal 70. The agricultural-field information section 174 displays information about a temporarily selected agricultural field G (including the surface area, management number, and address of the agricultural field G). The agricultural-field information section 174 includes an operable advance key 174*a*. The advance key 174*a* is an operable display image. The replacement defining unit 71*a* receives an operation performed on the advance key 174*a* so as to confirm that the agricultural field G corresponding to the temporarily selected outline 173 is selected.

As illustrated in FIG. 11, when any outline 173 is operated from among the outlines 173 of the agricultural fields G on the fifth map screen 171 and the advance key 174*a* is operated (Yes in step S35), the replacement defining unit 71*a* acquires an operation signal of the outline 173 and receives selection of the agricultural field G in step S36. When the replacement defining unit 71*a* receives the selection of the agricultural field Gin step S36, the replacement defining unit 71*a* transmits, to the server 50, information for identifying the selected agricultural field G (second agricultural-field information) in step S37.

When the replacement defining unit 71*a* transmits the second agricultural-field information to the server 50 in step S37, the second presenting unit 51*c* causes the second terminal display unit 74 to display a confirmation screen M8 in step S38.

Figure 14:
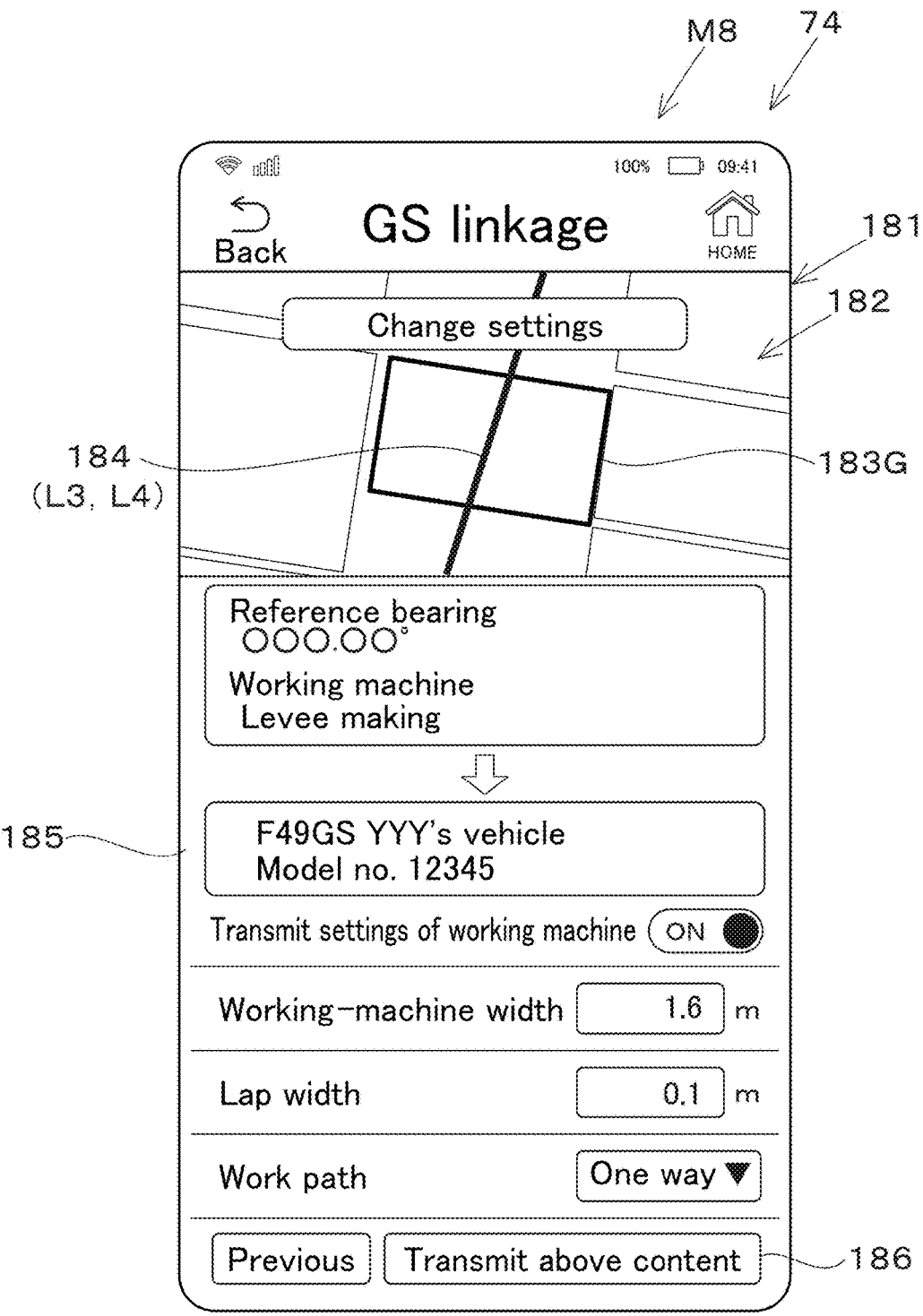
FIG. 14 illustrates a confirmation screen.

The confirmation screen M8 is used for confirming selection of a candidate line L3 corresponding to input work information received by the replacement defining unit 71*a* from among the candidate lines L3 stored in the database 53. As illustrated in FIG. 14, the confirmation screen M8 includes a sixth map screen 181 displaying an agricultural field (field) G, a third details input section 185, and a confirmation key 186. The sixth map screen 181 displays a bird's-eye-view map 182, and an outline 183 of the agricultural field G and a fifth imaginary line 184 that are displayed on the map 182.

As illustrated in FIG. 14, the fifth imaginary line 184 is a candidate line L3 extracted from the database 53 by the second presenting unit 51*c* based on work information received by the replacement defining unit 71*a*, and is displayed on the agricultural field (field) G.

The third details input section 185 is an area where work information to be performed along the candidate line L3 extracted by the second presenting unit 51*c* is inputtable. For example, a work width and a lap width are inputtable as the work information to the third details input section 185. The confirmation key 186 is to be operated for confirming the selection of the candidate line L3 displayed on the confirmation screen M8 and for confirming the work information input to the third details input section 185.

Therefore, as illustrated in FIG. 11, when the confirmation key 186 is operated (Yes in step S39), the replacement defining unit 71a acquires an operation signal of the confirmation key 186 and receives the selection of the candidate line L3 and the confirmation of the work information in step S40. When the replacement defining unit 71a receives the selection of the candidate line L3 and the confirmation of the work information in step S40, the command unit 71b transmits second confirmation information about the selection-confirmed candidate line L3 to the server 50, and commands the server 50 to transmit a replacement line L4 selected by the replacement defining unit 71a to the communicator 42 in step S41.

Accordingly, when the server 50 receives the second confirmation information about the candidate line L3 in step S41, the second setting unit 51d transmits, to the working vehicle 1, the selection-confirmed candidate line L3 received by the replacement defining unit 71a as a replacement line L4 from among the candidate lines L3 stored in the database 53 in step S42.

When the communicator 42 receives the replacement line L4 from the server communicator 52 after step S42, the controller 40 performs a process for replacing or not replacing the reference line L1 with the replacement line L4 depending on the status of a device provided in the working vehicle 1. The controller 40 replaces the reference line L1 with the replacement line L4 if the status of the device satisfies a predetermined condition, and does not replace the reference line L1 with the replacement line L4 if the status of the device does not satisfy the predetermined condition. The condition includes, for example, the status of the controller 40, the status of the automatic steering mechanism 37, and the status of the traveling device 7. For example, the controller 40 replaces the reference line L1 with the replacement line L4 if the working vehicle 1 has received the setting(s) related to the automatic steering, if the working vehicle 1 has stopped, or if the automatic steering is disabled. On the other hand, for example, the controller 40 does not replace the reference line L1 with the replacement line L4 if the working vehicle 1 has not received the setting(s) related to the automatic steering, if the working vehicle 1 is traveling, or if the automatic steering is enabled.

In detail, as illustrated in FIG. 1, the controller 40 includes a status acquiring unit that acquires the status of a device provided in the working vehicle 1. The status acquiring unit 40c includes electric and electronic component(s) provided in the controller 40 and/or program(s) installed in the memory unit 41. The device status to be acquired by the status acquiring unit 40c is mainly the operational status and the control status of the device. Based on control information about control that the controller 40 is performing on the device and information input to the controller 40 from the device or various sensors, the status acquiring unit acquires information about what type of operation the device is executing and what type of control the device is undergoing.

For example, the status acquiring unit 40c acquires control information of the display controller 21 to acquire information about whether or not the display 20 has received a change in the settings of the working vehicle 1, that is, information about whether the working vehicle 1 has received a change in the settings of the working vehicle 1, as the status of the device (controller 40).

The status acquiring unit 40c may acquire an operation signal input to the controller from the mode changing switch 25 and acquire information about whether the automatic steering by the automatic-steering control unit 40a is enabled or disabled as the status of the device (automatic steering mechanism 37).

The status acquiring unit 40c may acquire a vehicle-speed signal input to the controller 40 from the vehicle speed sensor that detects the vehicle speed of the working vehicle 1, and acquire information about whether the working vehicle 1 is in a stopped state or is traveling as the status of the device (traveling device 7).

The status acquiring unit 40c may acquire a control signal output from the controller to the prime mover 4, and acquire information about whether or not the prime mover 4 is in an idling state as the status of the device (prime mover 4).

The status acquiring unit 40c may acquire an operation signal input from the operation device 15 to the controller 40, and acquire information about whether or not the working vehicle 1 is operated by the operator as the status of the device (e.g., working device 2 or traveling device 7).

The device status acquired by the status acquiring unit 40c and the acquisition method therefor described above are merely examples. The information to be acquired and the source from which the information is acquired are not limited to the aforementioned examples so long as the status acquiring unit 40c can acquire the status of the device provided in the working vehicle 1.

The controller 40 switches between a first mode and a second mode in accordance with the status acquired by the status acquiring unit 40c. In detail, as illustrated in FIG. 1, the controller 40 includes a mode switch unit 40d that switches the controller 40 to the first mode or the second mode. The mode switch unit 40d switches the controller 40 to the first mode if the device status acquired by the status acquiring unit 40c satisfies a predetermined condition, and switches the controller 40 to the second mode if the device status does not satisfy the predetermined condition. The mode switch unit 40d includes electric and electronic component(s) provided in the controller 40 and/or program(s) installed in the memory unit 41. The first mode is a mode in which the controller 40 replaces the reference line L1 with the replacement line L4 transmitted from the server 50. The second mode is a mode in which the controller 40 does not replace the reference line L1 with the replacement line L4 transmitted from the server 50.

When in the first mode, the controller 40 allows the communicator 42 to receive the replacement line L4 from the server 50. When the controller 40 is in the first mode and the communicator 42 receives the replacement line L4 from the server 50, the controller 40 writes the replacement line L4 over the reference line L1 stored in the memory unit 41, so that the replacement line L4 can be registered.

On the other hand, when in the second mode, the controller 40 restricts the reception of the replacement line L4 from the server 50 by the communicator 42.

The mode switching of the mode switch unit 40d will be described below with reference to an example where the mode switch unit 40d switches the mode of the controller 40 depending conditionally on whether or not the working vehicle 1 has received the settings related to the automatic steering. In this preferred embodiment, the mode switch unit 40d switches the controller 40 to the first mode if the working vehicle 1 has received the settings related to the automatic steering, and switches the controller 40 to the second mode if the working vehicle 1 has not received the settings related to the automatic steering.

The working vehicle 1 includes first operation actuators 221 and 251 that each receive an operation to change the setting(s) related to the automatic steering. The status acquiring unit 40c is configured or programmed to acquire information indicating that the first operation actuator(s) 221 and/or 251 has/have received the operation to change the setting(s) or has/have not received the operation to change the setting(s). If the status acquiring unit 40c acquires information indicating that the first operation actuator(s) 221 and/or 251 has/have received the operation to change the setting(s), the mode switch unit 40d switches the controller 40 to the first mode. On the other hand, if the status acquiring unit 40c acquires information indicating that the first operation actuator(s) 221 and/or 251 has/have not received the operation to change the setting(s), the mode switch unit 40d switches the controller 40 to the second mode.

In this preferred embodiment, each of the first operation actuators 221 and 251 is an operable display image displayed on a setting check screen M10 when the display screen 22 is displaying a resetting screen M11. In this case, the status acquiring unit 40c acquires information about whether or not the display 20 is in a state for changing the settings related to the automatic steering, and acquires information indicating that the first operation actuator(s) 221 and/or 251 has/have received the operation to change the setting(s) or has/have not received the operation to change the setting(s).

The first operation actuators 221 and 251 are not limited to display images displayed on the display screen 22 and may be, for example, physical switches so long as each of the first operation actuators 221 and 251 is an operation actuator for actuating a trigger related to the settings related to the automatic steering.

As illustrated in FIG. 1, the display 20 includes a changer 21a that receives a change of the replacement line L4 received by the communicator 42. The changer 21a includes electric and electronic component(s) provided in the display controller 21 and/or program(s) installed in the memory unit 41. When the display screen 22 is displaying a screen (setting screen M16) that receives a change of the replacement line L4, the changer 21a receives a change of the replacement line L4 in response to an operation received by the operation member 23. The controller 40 can apply the change of the replacement line L4 by writing the changed replacement line L4 over the reference line L1 stored in the memory unit 41.

The replacement of the reference line L1 with the replacement line L4 by the working-vehicle support system S and the screen transition on the display 20 will be described below with reference to FIG. 15A to FIG. 22. In the initial state, the controller 40 is switched to the second mode in advance.

Figure 15A:
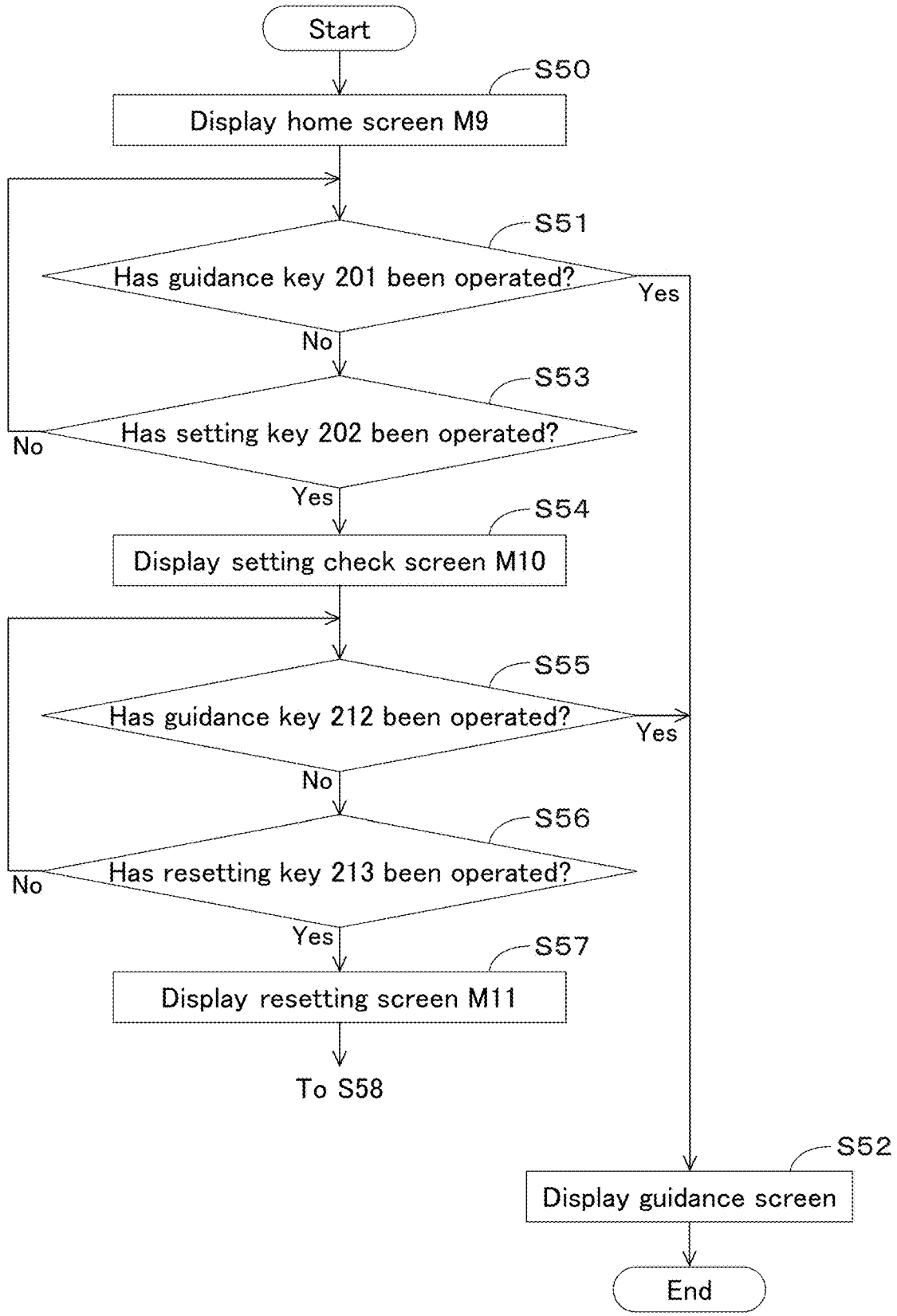
FIG. 15A is a first diagram explaining mode switching of a controller and the transition of a screen displayed by a display screen.
Figure 16:
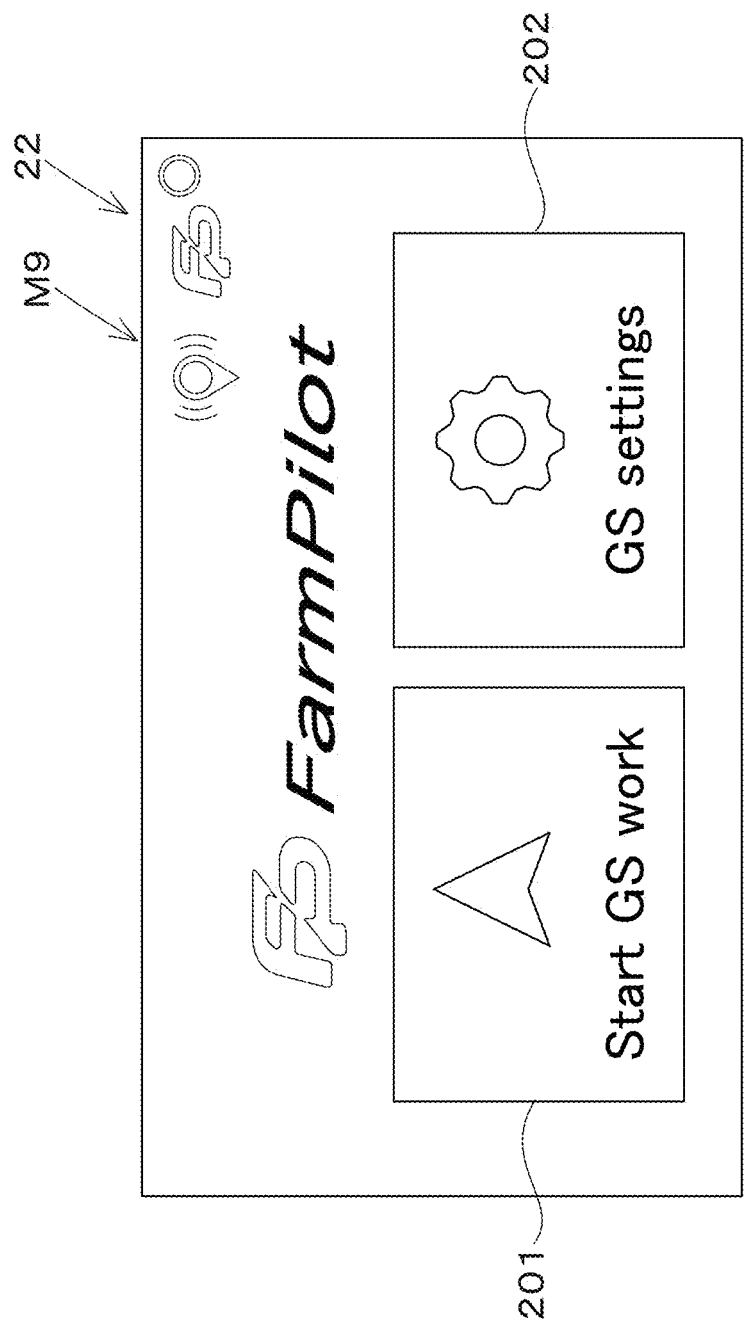
FIG. 16 illustrates a home screen.

As illustrated in FIG. 15A, in step S50, the display controller 21 causes the display screen 22 to display a home screen M9 as an initial screen displayed when, for example, the display 20 is not operated for a certain period of time. The home screen M9 displays optional display images. The display controller 21 receives selection of a display image in response to an operation performed on the operation member 23. As illustrated in FIG. 16, the home screen M9 displays a guidance key 201 and a setting key 202 as the optional display images.

The guidance key 201 is a display image that receives a selecting operation for transition to a guidance screen (not illustrated) that provides operational guidance when the automatic steering is to be executed. In other words, when the display controller 21 receives a selecting operation performed on the guidance key 201 (Yes in step S51), the display controller 21 displays the guidance screen in step S52. The guidance screen displays an operation related to the automatic steering. In detail, for example, the guidance screen provides guidance for switching the automatic steering from the disabled mode to the enabled mode in response to an operation performed on the mode changing switch 25 or for starting the automatic steering (setting the automatic steering) and terminating the automatic steering (canceling the automatic steering) in response to an operation performed on the steering changeover switch 26.

The setting key 202 is a display image that receives, when selected, the setting check screen M10 displaying the settings related to the automatic steering. Therefore, when the display controller 21 receives a selecting operation performed on the setting key 202 (Yes in step S53), the display controller 21 causes the display screen 22 to display the setting check screen M10 in step S54.

Figure 17:
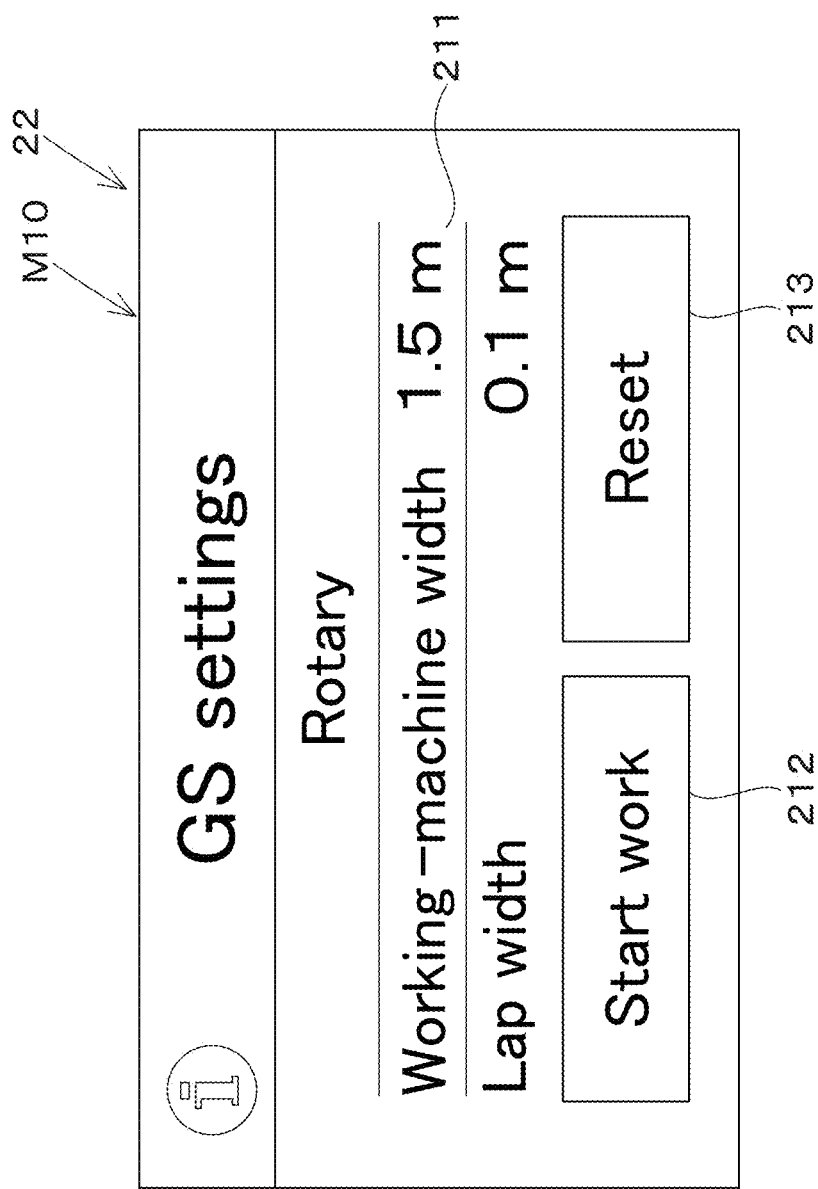
FIG. 17 illustrates a setting check screen.

As illustrated in FIG. 17, the setting check screen M10 displays a work-information display section 211, a guidance key 212, and a resetting key 213. The work-information display section 211 displays work information of a reference line L1 stored in the memory unit 41. The display controller 21 acquires the work information of the reference line L1 stored in the memory unit 41 via the controller 40 and causes the work-information display section 211 to display the work information. In an example illustrated in FIG. 16, the work-information display section 211 displays information (work content, working-machine width, and lap width) about the working device 2 used in work by the working vehicle 1 as the work information.

The guidance key 212 is a display image that receives a selecting operation for transition to a guidance screen (not illustrated) that provides operational guidance when the automatic steering is to be executed. In other words, when the display controller 21 receives a selecting operation performed on the guidance key 212 in the setting check screen M10 (Yes in step S55), the display controller 21 causes the display screen 22 to display the guidance screen in step S52, similarly to the case where the selecting operation performed on the guidance key 201 in the home screen M9 is received.

The resetting key 213 is a display image that receives, when selected, the resetting screen M11. The resetting screen M11 receives selection of a method for changing the settings related to the automatic steering. When the display controller 21 receives a selecting operation performed on the resetting key 213 (Yes in step S56), the display controller 21 causes the display screen 22 to display the resetting screen M11 in step S57.

Figure 18:
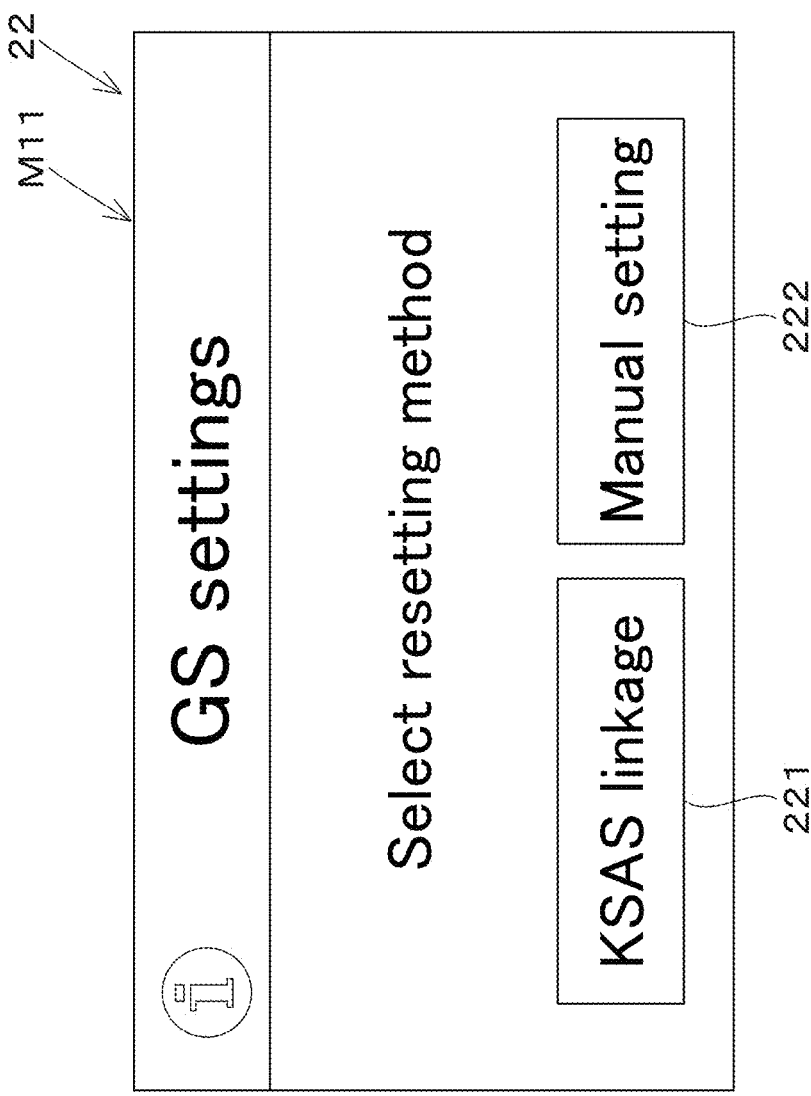
FIG. 18 illustrates a resetting screen.

As illustrated in FIG. 18, the resetting screen M11 displays the first operation actuator (download key) 221 and a manual key 222. The download key 221 is a display image that receives an operation and that is used for changing the settings related to the automatic steering.

Figure 15B:
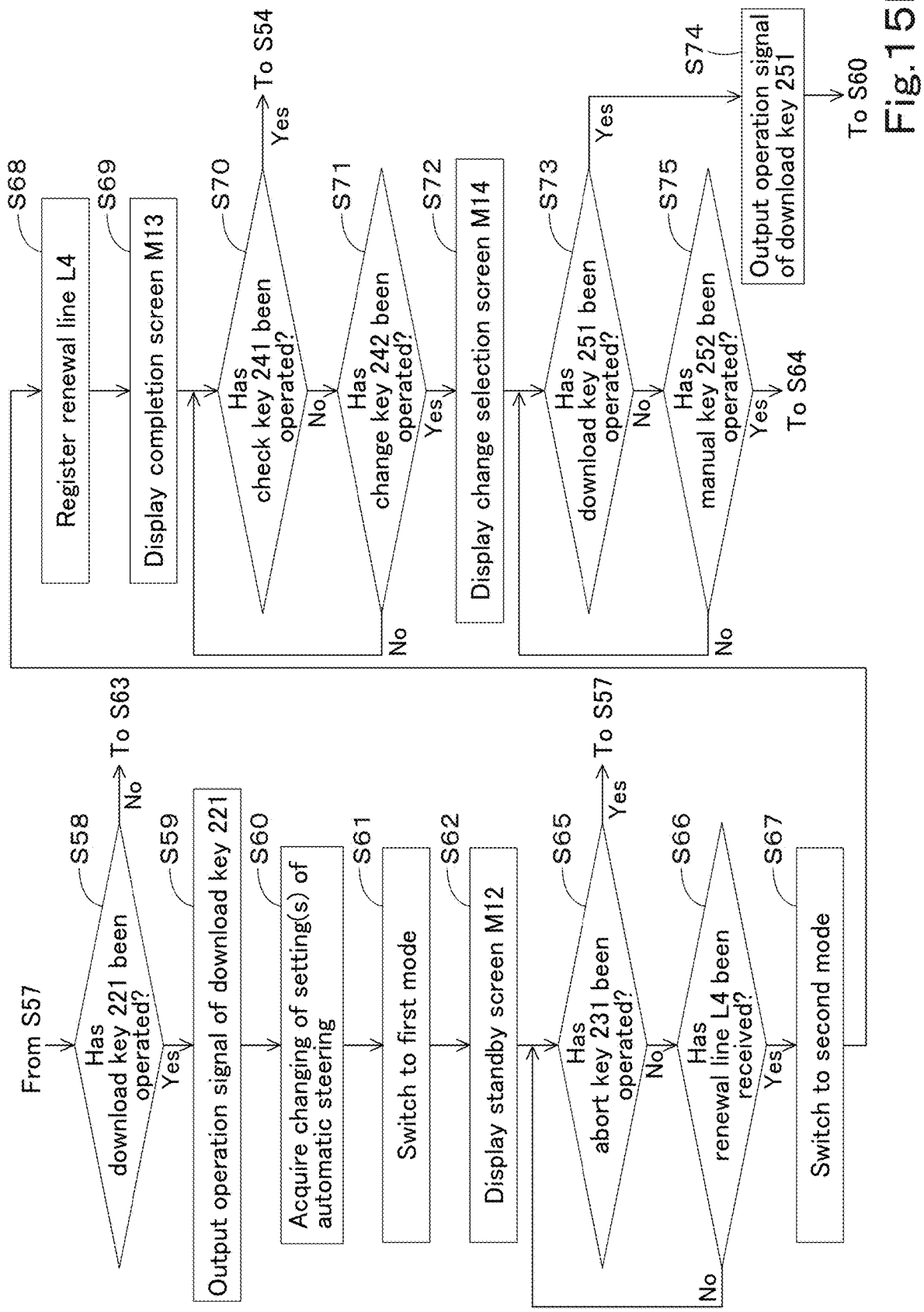
FIG. 15B is a second diagram explaining the mode switching of the controller and the transition of the screen displayed by the display screen.

As illustrated in FIG. 15B, when the display controller 21 receives a selecting operation performed on the download key 221 (Yes in step S58), the display controller 21 outputs an operation signal of the download key 221 to the controller 40 in step S59.

When the controller 40 receives the operation signal of the download key 221 in step S59, the status acquiring unit 40c acquires information indicating that the download key (first operation actuator) 221 has received the operation to change the setting(s) relating to the automatic steering, based on the operation signal in step S60. When the status acquiring unit 40c acquires information indicating that the setting(s) relating to the automatic steering is/are to be changed, that is, when a mode switching condition is satisfied in step S60, the mode switch unit 40d switches the controller 40 to the first mode and allows the communicator 42 to receive a replacement line L4 from the server 50 in step S61. In step S62, the display controller 21 causes the display screen 22 to display a standby screen M12 illustrated in FIG. 19.

The manual key 222 is a display image that receives, when selected, a command for transition from the resetting screen M11 to a manual change screen M15 to be described below. In a case where the display controller 21 has not received a selecting operation of the download key 221 (No in step S58), when the display controller 21 receives a selecting operation performed on the manual key 222 (Yes in step S63), the display controller 21 causes the display screen 22 to display the manual change screen M15, to be described below, in step S64, as illustrated in FIG.

Figure 19:
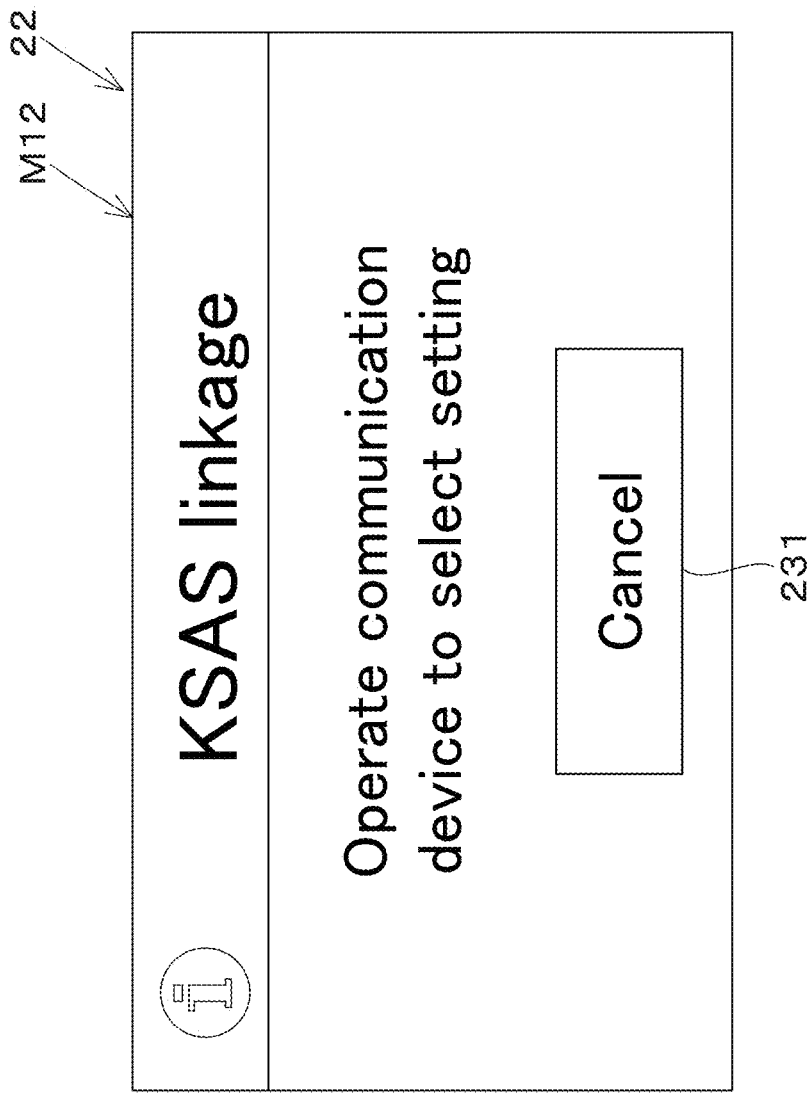
FIG. 19 illustrates a standby screen.

The standby screen M12 is displayed on the display screen 22 until a replacement line L4 is transmitted from the server 50 to the communicator 42 when the controller 40 is in the first mode. As illustrated in FIG. 19, the standby screen M12 displays a prompt message asking for operation of the portable terminal 70 to cause the server 50 to transmit a replacement line L4. The standby screen M12 includes a cancel key 231.

The cancel key 231 is a display image that receives, when selected, a command for transition from the standby screen M12 to the resetting screen M11. As illustrated in FIGS. 15A and 15B, when the display controller 21 receives a selecting operation performed on the cancel key 231 (Yes in step S65), the display controller 21 causes the display screen 22 to display the resetting screen M11 in step S57.

When the display controller 21 has not received a selecting operation of the cancel key 231 (No in step S65) and the communicator 42 receives a replacement line L4 from the server 50 (Yes in step S66), the mode switch unit 40d switches the controller 40 to the second mode and restricts the communicator 42 from receiving the replacement line L4 from the server 50 (step S67). In step S68, the controller 40 registers the replacement line L4 received by the communicator 42 in step S66 as a reference line L1.

Figure 20:
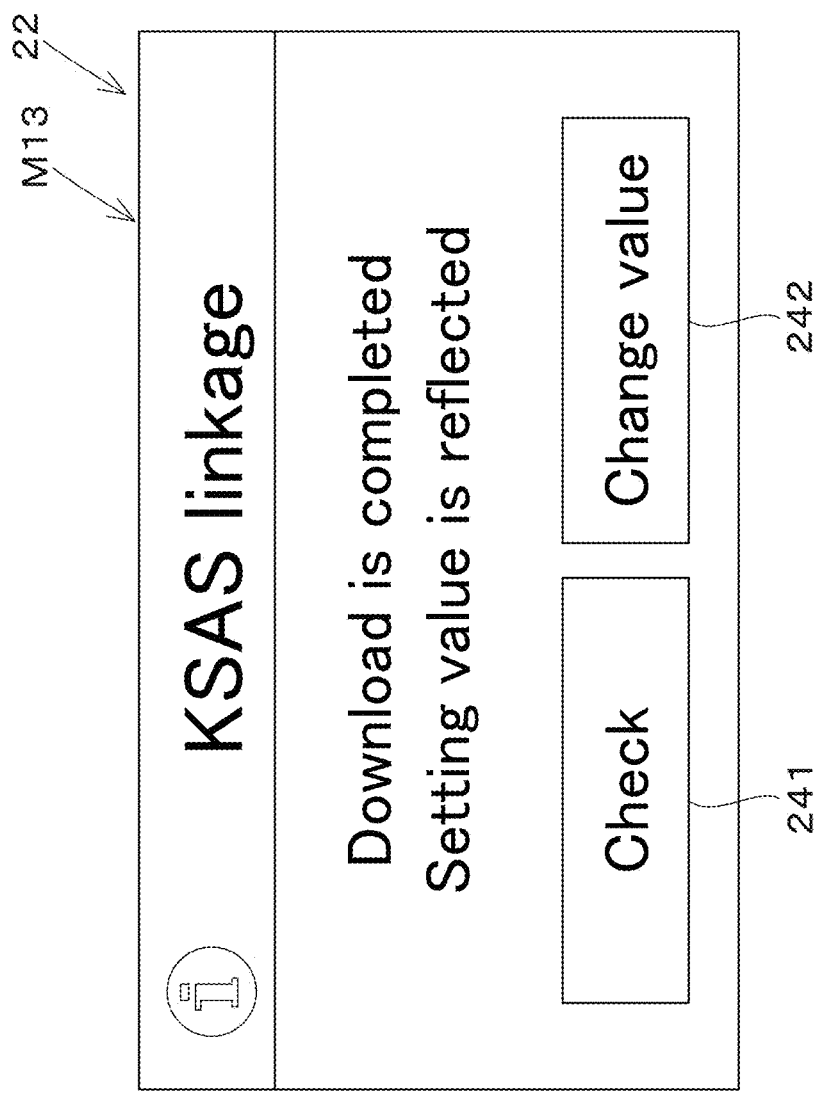
FIG. 20 illustrates a completion screen.

When the controller 40 writes the replacement line L4 over the reference line L1 and registers the replacement line L4 as a reference line L1 in step S68, the display controller 21 causes the display screen 22 to display a completion screen M13 illustrated in FIG. 20 in step S69.

The completion screen M13 is a screen indicating that the replacement line L4 has been transmitted from the server 50 to the communicator 42 and that the replacement line L4 has been registered as a reference line L1. The completion screen M13 displays a message indicating that the replacement line L4 has been transmitted from the server 50 to the communicator 42 and that the replacement line L4 has been registered as a reference line L1. The completion screen M13 includes a check key 241 and a change key 242.

The check key 241 is a display image that receives, when selected, a command for transition from the completion screen M13 to the setting check screen M10. When the display controller 21 receives a selecting operation performed on the check key 241 (Yes in step S70), the display controller 21 causes the display screen 22 to display the setting check screen M10 in step S54.

The change key 242 is a display image that receives, when selected, a command for transition from the completion screen M13 to a change selection screen M14. When the display controller 21 has not received a selecting operation of the check key 241 (No in step S70) and receives a selecting operation performed on the change key 242 (Yes in step S71), the display controller 21 causes the display screen 22 to display the change selection screen M14 in step S72.

Figure 21:
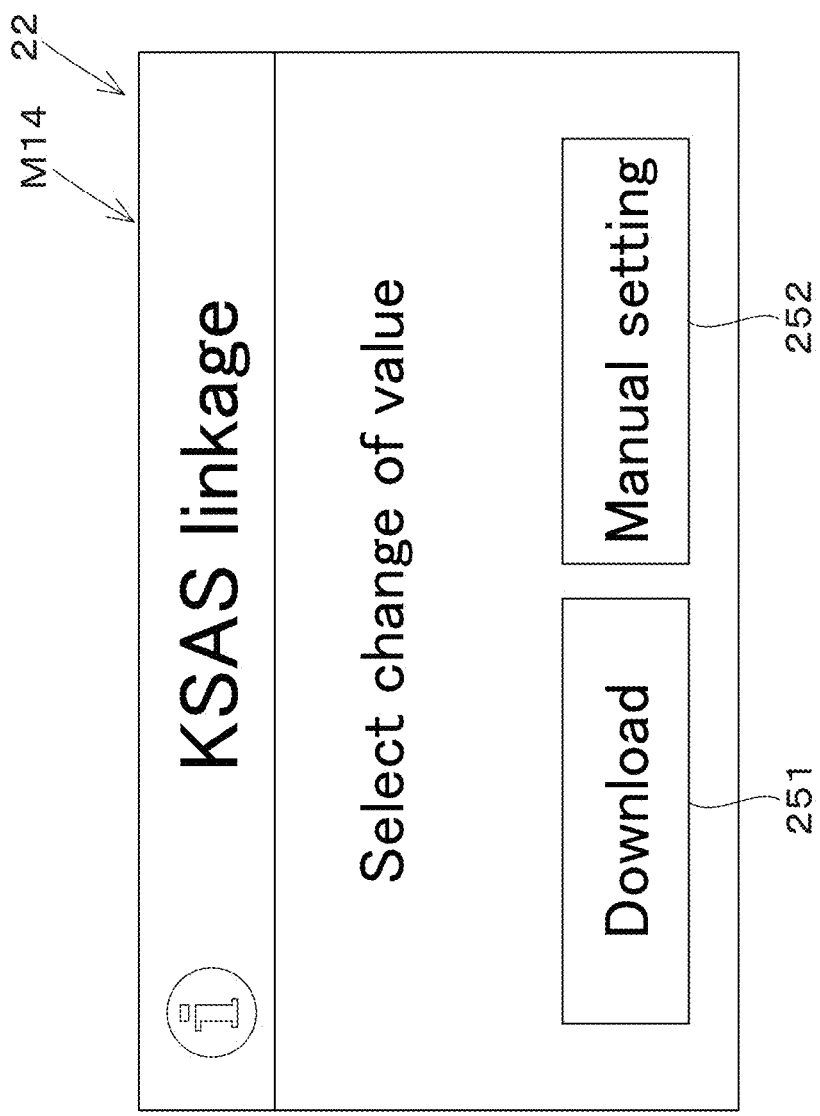
FIG. 21 illustrates a change selection screen.

As illustrated in FIG. 21, the change selection screen M14 is similar to the resetting screen M11 in that the change selection screen M14 displays the first operation actuator (download key) 251 and a manual key 252. The download key 251 is a display image that receives an operation and that is used for changing the settings related to the automatic steering. When the display controller 21 receives a selecting operation performed on the download key 251 (Yes in step S73), the display controller 21 outputs an operation signal of the download key 251 to the controller 40 in step S74 and proceeds to step S60.

The manual key 252 is a display image that receives, when selected, a command for transition from the change selection screen M14 to the manual change screen M15. When the display controller 21 has not received a selecting operation of the download key 251 (No in step S73) and receives a selecting operation performed on the manual key 252 (Yes in step S75), the display controller 21 causes the display screen 22 to display the manual change screen M15 in step S64.

Figure 15C:
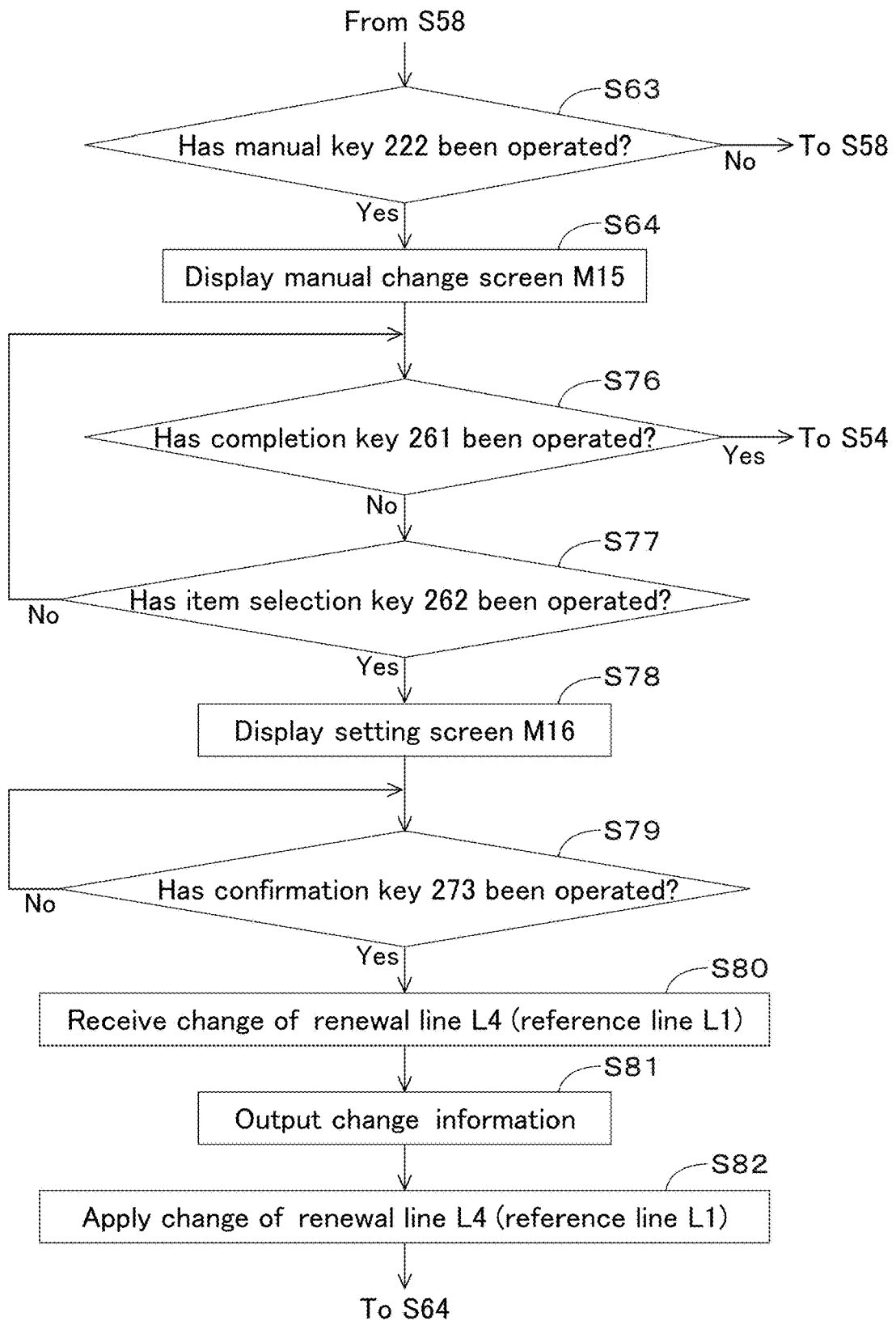
FIG. 15C is a third diagram explaining the mode switching of the controller and the transition of the screen displayed by the display screen.
Figure 22:
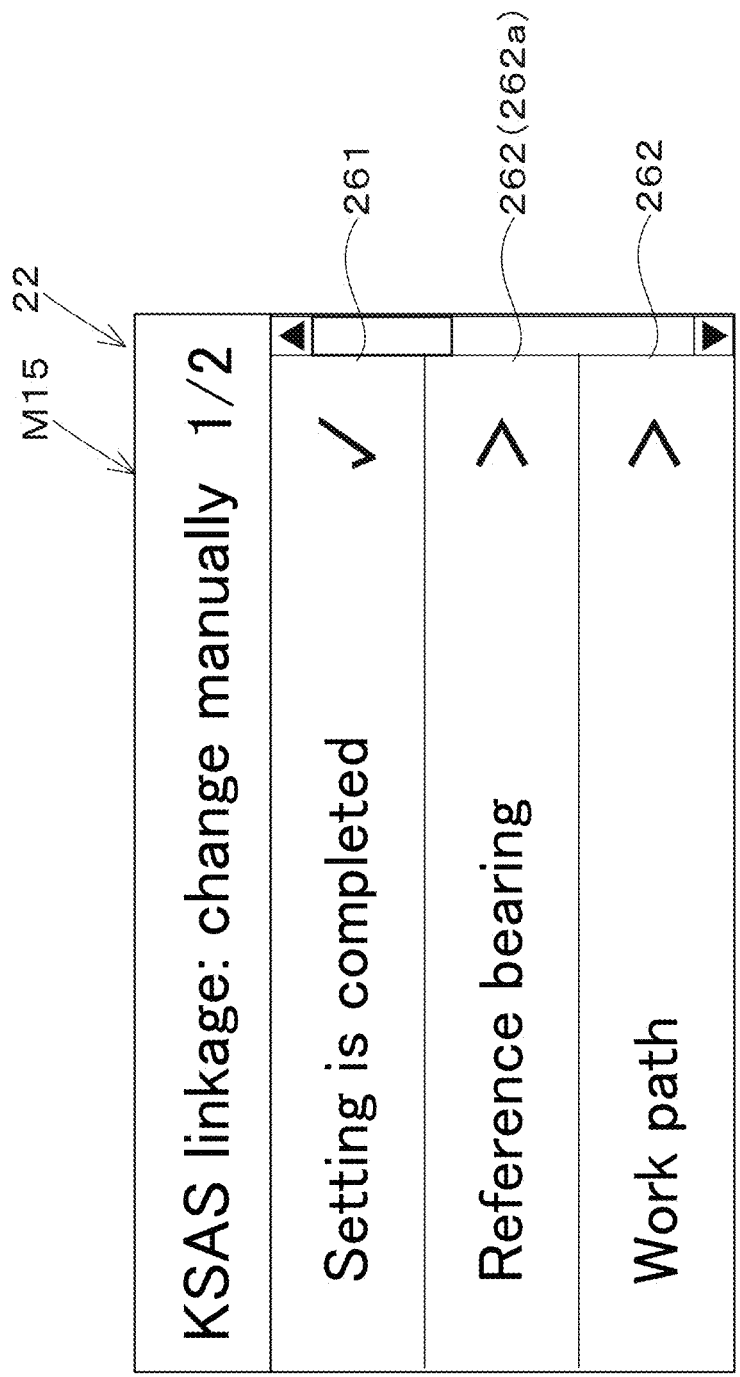
FIG. 22 illustrates a manual change screen.

When the manual key 222 on the resetting screen M11 or the manual key 252 on the change selection screen M14 is operated, the display controller 21 causes the display screen 22 to display the manual change screen M15 in step S64, as illustrated in FIG. 22. The manual change screen M15 is a screen used for selecting an item to be changed from among the settings related to the automatic steering by operating the display 20. The manual change screen M15 includes a completion key 261 and item selection keys 262. The completion key 261 is a display image that receives an operation and that is used for completing the settings related to the automatic steering. The completion key 261 is a display image that receives, when selected, a command for transition from the manual change screen M15 to the setting check screen M10. As illustrated in FIG. 15C, when the display controller 21 receives a selecting operation performed on the completion key 261 (Yes in step S76), the display controller 21 causes the display screen 22 to display the setting check screen M10 in step S54.

Figure 23:
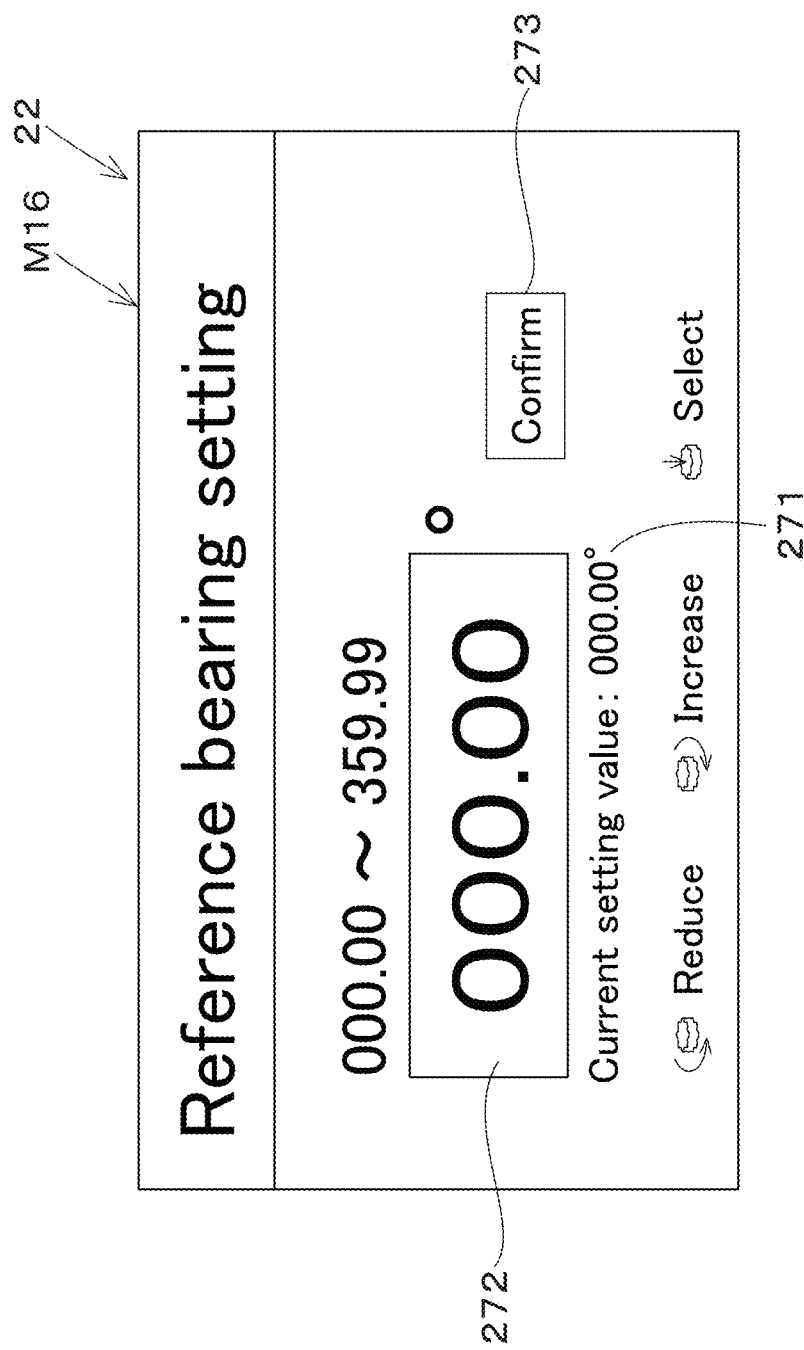
FIG. 23 illustrates a setting screen.

Each of the item selection keys 262 is a display image that receives an operation and that receives selection of a target to be changed from among the settings related to the automatic steering. The item selection keys 262 include a bearing change key 262a that receives selection of a change of the reference line L1 (replacement line L4). When the display controller 21 has not received a selecting operation of the completion key 261 (No in step S76) and receives a selecting operation performed on any of the item selection keys 262 (Yes in step S77), the display controller 21 causes the display screen 22 to display a screen (setting screen M16) that receives a change in the settings in step S78, as illustrated in FIG. 23. The manual change screen M15 may have at least an item selection key 262 that receives selection of a change in the setting of the reference line L1 (replacement line L4), and may have a display image that receives selection of another setting as a setting related to the automatic steering.

The setting screen M16 receives a change in the setting of the reference line L1 (replacement line L4). FIG. 23 illustrates the setting screen M16 displayed by the display controller 21 when the bearing change key 262a is selected from the item selection keys 262. As illustrated in FIG. 23, the setting screen M16 includes a line display section 271, a line input section 272, and a confirmation key 273.

The line display section 271 is a display image displaying a reference line L1 stored in the memory unit 41. In this preferred embodiment, since a reference line L1 is defined using a bearing indicating the reference line L1, the line display section 271 displays the reference line L1 with a bearing angle. In other words, since the line display section 271 displays the reference line L1 stored in the memory unit 41, if the reference line L1 is an updated reference line L1 obtained by replacing the reference line L1 with the replacement line L4, it may be regarded that the display 20 displays the replacement line L4 in the line display section 271.

The line input section 272 receives a change of the reference line L1 stored in the memory unit 41 in response to an operation received by the operation member 23. In this preferred embodiment, since a reference line L1 is defined using a bearing indicating the reference line L1, the line input section 272 receives a change of the reference line L1 by receiving an input of a bearing angle.

The line input section 272 displays the reference line L1 stored in the memory unit 41 as an initial value and changes the display of the bearing angle in response to an operation performed on the operation member 23. In other words, since the line input section 272 receives a change of the reference line L1 stored in the memory unit 41, if the reference line L1 is an updated reference line L1 obtained by replacing the reference line L1 with the replacement line L4, it may be regarded that the line input section 272 receives a change of the replacement line L4.

Although the line input section 272 receives an input of a bearing angle in this preferred embodiment, the input method is not limited to the above-described method so long as the line input section 272 is capable of receiving a change of the reference line L1 stored in the memory unit 41 in response to an operation received by the operation member 23.

As illustrated in FIG. 15C, the confirmation key 273 is a display image that receives an operation and that receives confirmation of a change of the input reference line L1 received by the line input section 272. When the display controller 21 receives an operation performed on the confirmation key 273 (Yes in step S79), the changer 21a receives a change of the reference line L1 in step S80. In step S81, the changer 21a outputs, to the controller 40, information (change information) related to the change of the reference line L1 received by the line input section 272.

Accordingly, the controller 40 writes the changed reference line L1 received by the changer 21a over the reference line L1 (replacement line L4) stored in the memory unit 41 based on the change information, thus applying the change of the reference line L1 (replacement line L4) in step S82. When the controller 40 applies the change of the reference line L1 in step S82, the display controller 21 causes the display screen 22 to display the manual change screen M15 in step S64.

Although the above-described preferred embodiment relates to an example where the mode switch unit 40d switches the mode (first mode or second mode) of the controller 40 depending on whether or not the working vehicle 1 has received the setting(s) related to the automatic steering with regard to the replacement of the reference line L1 with the replacement line L4 by the working-vehicle support system S, the mode switch unit 40d may switch the mode of the controller 40 depending conditionally on whether the automatic steering is enabled or disabled. In this case, if the status acquiring unit 40c acquires information indicating that the automatic steering is disabled by the second operation actuator 25, the mode switch unit 40d switches the controller 40 to the first mode. If the status acquiring unit 40c acquires information indicating that the automatic steering is enabled by the second operation actuator 25, the mode switch unit 40d switches the controller 40 to the second mode.

Figure 24:
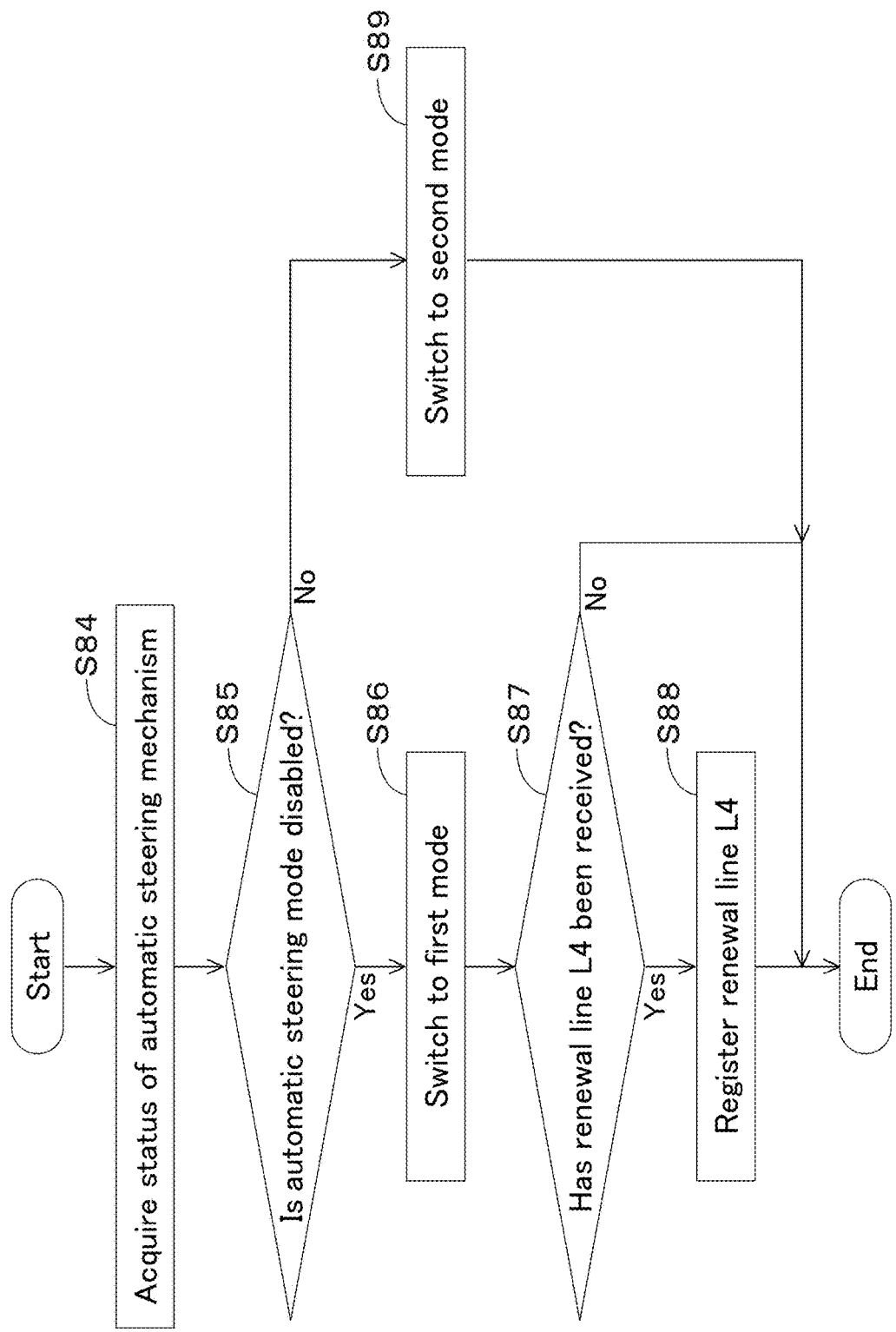
FIG. 24 is a diagram explaining the mode switching of the controller according to a first variation of a preferred embodiment of the present invention.

The mode switching by the mode switch unit 40d according to a first variation of a preferred embodiment of the present invention and the replacement of the reference line L1 with the replacement line L4 by the working-vehicle support system S will be described below with reference to FIG. 24. In the initial state, the controller 40 is switched to the second mode in advance.

First, the status acquiring unit 40c acquires an operation signal input to the controller 40 from the mode changing switch 25 and acquires information about whether the automatic steering by the automatic-steering control unit 40a is enabled or disabled as the status of the device (automatic steering mechanism 37) in step S84. When the status acquiring unit 40c acquires the information about whether the automatic steering by the automatic-steering control unit 40a is enabled or disabled as the status of the device (automatic steering mechanism 37) in step S84, the mode switch unit 40d checks whether the automatic steering by the automatic-steering control unit 40a is disabled in step S85.

If the mode switch unit 40d determines that the automatic steering by the automatic-steering control unit 40a is disabled (Yes in step S85), that is, if the mode switching condition is satisfied, the mode switch unit 40d switches the controller 40 to the first mode and allows the communicator 42 to receive a replacement line L4 from the server 50 in step S86.

When the communicator 42 receives the replacement line L4 from the server 50 (Yes in step S87), the controller 40 registers the replacement line L4 received by the communicator 42 from the server 50 as a reference line L1 in step S88.

In contrast, if the mode switch unit 40d determines that the automatic steering by the automatic-steering control unit 40a is enabled (No in step S85), that is, if the mode switching condition is not satisfied, the mode switch unit 40d switches the controller 40 to the second mode and restricts the reception of the replacement line L4 from the server 50 by the communicator 42 in step S89.

The mode switch unit 40d may switch the mode of the controller 40 depending conditionally on whether the vehicle body 3 is in a stopped state or is traveling. The mode switch unit 40d switches the controller 40 to the first mode if the status acquiring unit 40c acquires information indicating that the vehicle body 3 has stopped traveling, and switches the controller to the second mode if the status acquiring unit 40c acquires information indicating that the vehicle body 3 is traveling.

Figure 25:
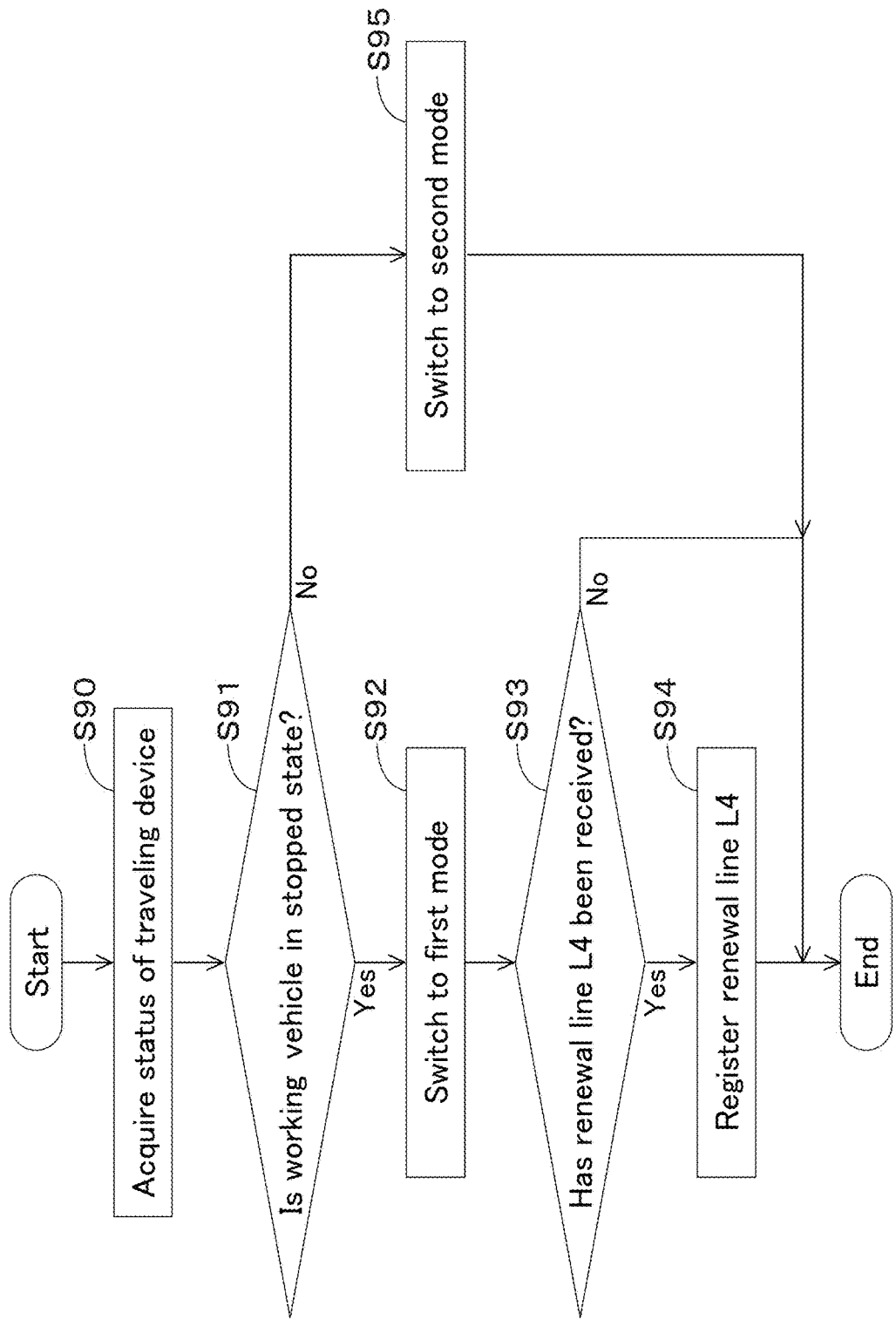
FIG. 25 is a diagram explaining the mode switching of the controller according to a second variation of a preferred embodiment of the present invention.

The mode switching of the controller 40 according to a second variation of a preferred embodiment of the present invention and the replacement of the reference line L1 with the replacement line L4 by the working-vehicle support system S will be described below with reference to FIG. 25. In the initial state, the controller 40 is switched to the second mode in advance.

First, the status acquiring unit 40c acquires a vehicle speed signal input to the controller 40 from the vehicle speed sensor and acquires information about whether the working vehicle 1 is in a stopped state or is traveling as the status of the device (traveling device 7) in step S90.

When the status acquiring unit 40c acquires the information about whether the working vehicle 1 is in a stopped state or is traveling in step S90, the mode switch unit 40d checks whether the working vehicle 1 is in a stopped state in step S91.

If the mode switch unit 40*d* determines that the working vehicle 1 is in a stopped state (Yes in step S91), that is, if the mode switching condition is satisfied, the mode switch unit switches the controller 40 to the first mode and allows the communicator 42 to receive a replacement line L4 from the server 50 (step S92).

When the communicator 42 receives the replacement line L4 from the server 50 (Yes in step S93), the controller 40 registers the replacement line L4 received by the communicator 42 from the server 50 as a reference line L1 (step S94).

In contrast, if the mode switch unit 40*d* determines that the working vehicle 1 is traveling (No in step S91), that is, if the mode switching condition is not satisfied, the mode switch unit 40*d* switches the controller 40 to the second mode and restricts the communicator 42 from receiving the replacement line L4 from the server 50 (step S95).

Although the mode switch unit 40*d* switches the controller 40 to the first mode when the working vehicle 1 is in a stopped state and switches the controller 40 to the second mode when the working vehicle 1 is traveling in the second variation described above, the above-described mode switching of the controller 40 is merely an example. If the status acquiring unit acquires information about whether the traveling speed of the working vehicle 1 is below a threshold value or above or equal to the threshold value as the status of the device (traveling device 7), for example, the mode switch unit 40*d* may switch the controller 40 to the first mode when the traveling speed of the working vehicle 1 is below the threshold value and may switch the controller to the second mode when the traveling speed of the working vehicle 1 is above or equal to the threshold value.

As another alternative, if the status acquiring unit 40*c* acquires a control signal from the controller 40 to the prime mover 4 and acquires information about whether or not the prime mover 4 is in an idling state as the status of the device (prime mover 4), for example, the mode switch unit 40*d* may switch the controller 40 to the first mode when the prime mover 4 is in an idling state and may switch the controller 40 to the second mode when the prime mover 4 is not in an idling state.

As another alternative, if the status acquiring unit 40*c* acquires an operation signal input from the operation device 15 to the controller 40 and acquires information about whether or not the working vehicle 1 is operated by the operator as the status of the device (e.g., working device 2 or traveling device 7), for example, the mode switch unit 40*d* may switch the controller to the first mode when the working vehicle 1 is operated by the operator and may switch the controller 40 to the second mode when the working vehicle 1 is not operated by the operator.

The mode switch unit 40*d* may switch the mode of the controller 40 based on a plurality of conditions, and the device status acquired by the status acquiring unit 40*c* and the mode switching conditions may be combined, where appropriate. For example, if the working vehicle 1 receives the settings related to the automatic steering and the status acquiring unit 40*c* acquires information indicating that the working vehicle 1 is in a stopped state, the mode switch unit 40*d* may switch the controller 40 to the first mode. In contrast, if the working vehicle 1 has not received the settings related to the automatic steering or if the status acquiring unit 40*c* acquires information indicating that the working vehicle 1 is traveling, the mode switch unit 40*d* may switch the controller 40 to the second mode.

If the automatic steering is disabled by the second operation actuator 25 and the status acquiring unit 40*c* acquires information indicating that the working vehicle 1 is in a stopped state, the mode switch unit 40*d* may switch the controller 40 to the first mode. In contrast, if the automatic steering is enabled by the second operation actuator 25 or if the status acquiring unit acquires information indicating that the working vehicle 1 is traveling, the mode switch unit may switch the controller 40 to the second mode.

Note that the controller 40 need only replace the reference line L1 with the replacement line L4 transmitted from the server 50 when in the first mode and not replace the reference line L1 with the replacement line L4 transmitted from the server 50 when in the second mode. The method of not replacing the reference line L1 with the replacement line L4 is not limited to restricting the communicator 42 from receiving the replacement line L4.

For example, when in the first mode, the controller 40 may register the replacement line L4 received by the communicator 42 from the server 50 as a reference line L1. When in the second mode, the controller 40 may retain the replacement line L4 received by the communicator 42 from the server 50 without registering the replacement line L4 as a reference line L1, and may register the retained replacement line L4 as a reference line L1 when the controller 40 enters the first mode. In detail, the controller 40 retains the replacement line L4 by causing the memory unit 41 to temporarily store the replacement line L4. After the controller 40 retains the replacement line L4, if the communicator 42 receives a new replacement line L4, the controller 40 deletes the retained replacement line L4.

Figure 26:
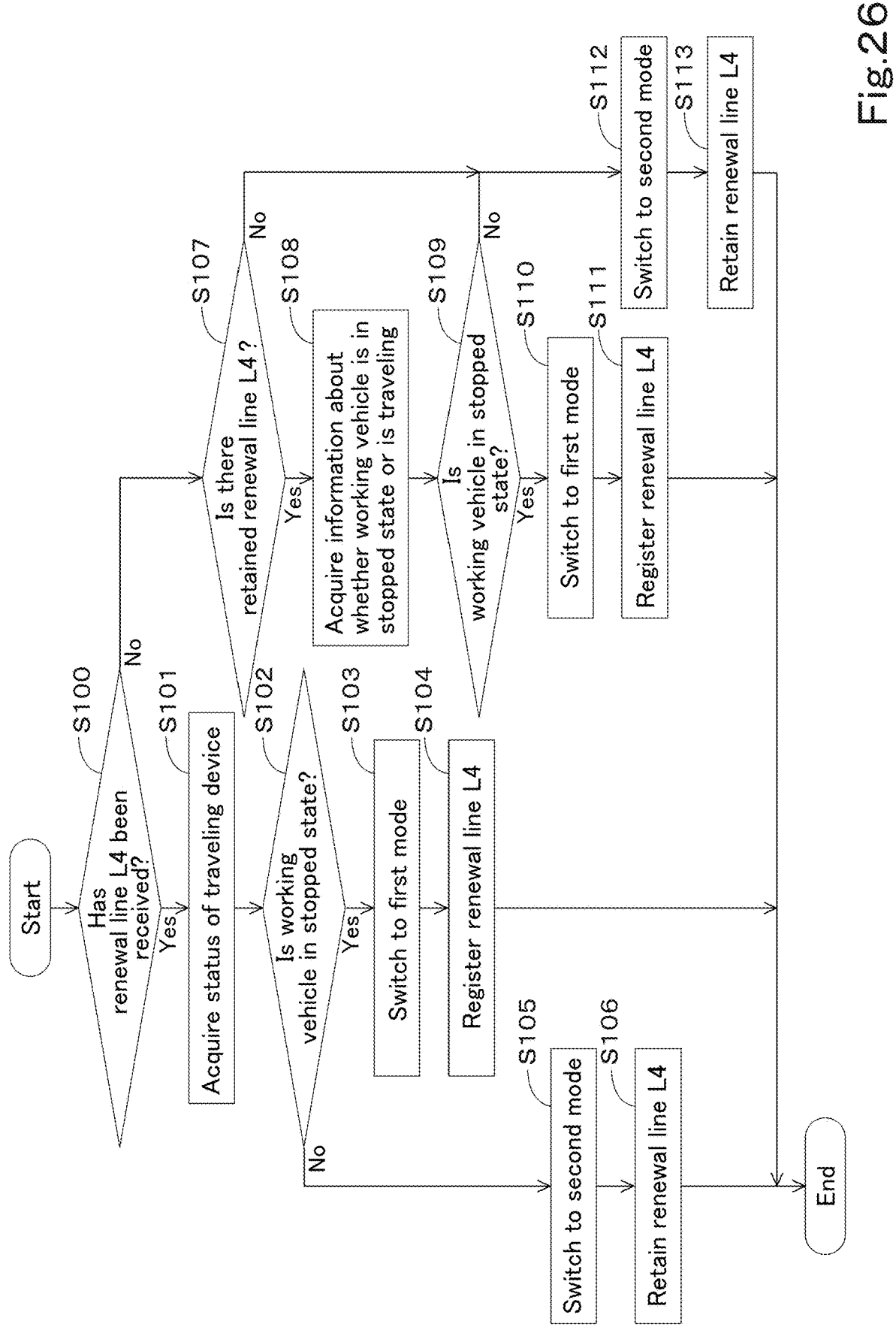
FIG. 26 is a diagram explaining the replacement of the reference line with the replacement line according to a third variation of a preferred embodiment of the present invention.

The following description with reference to FIG. 26 discusses the replacement of the reference line L1 with the replacement line L4 by the working-vehicle support system S according to a third variation of a preferred embodiment of the present invention with reference to an example where the mode switch unit 40*d* switches the mode of the controller 40 depending conditionally on whether the vehicle body 3 is in a stopped state or is traveling. In the initial state, the controller 40 is switched to the second mode in advance.

First, the controller 40 checks whether the communicator 42 has received a replacement line L4 from the server 50 in step S100. If the controller 40 confirms that the communicator 42 has received the replacement line L4 from the server 50 (Yes in step S100), the status acquiring unit 40*c* acquires a vehicle speed signal input to the controller 40 from the vehicle speed sensor, and acquires information about whether the working vehicle 1 is in a stopped state or is traveling as the status of the device (traveling device 7) in step S101.

When the status acquiring unit 40*c* acquires the information about whether the working vehicle 1 is in a stopped state or is traveling in step S101, the mode switch unit 40*d* checks whether the working vehicle 1 is in a stopped state in step S102.

If the mode switch unit 40*d* determines that the working vehicle 1 is in a stopped state (Yes in step S102), that is, if the mode switching condition is satisfied, the mode switch unit switches the controller 40 to the first mode in step S103. The controller 40 registers the replacement line L4 received by the communicator 42 from the server 50 as a reference line L1 in step S104.

In contrast, if the mode switch unit 40*d* determines that the working vehicle 1 is traveling (No in step S102), that is, if the mode switching condition is not satisfied, the mode switch unit 40*d* switches the controller 40 to the second mode in step S105. In step S106, the controller 40 retains the replacement line L4 received by the communicator 42 from the server 50 without registering the replacement line L4 as a reference line L1.

If the controller 40 confirms that the communicator 42 has not received a replacement line L4 from the server 50 (No in step S100), the controller 40 checks whether there is a retained replacement line L4 in step S107. If there is a replacement line L4 retained in the memory unit 41 (Yes in step S107), the status acquiring unit 40c acquires a vehicle speed signal input to the controller 40 from the vehicle speed sensor and acquires information about whether the working vehicle 1 is in a stopped state or is traveling as the status of the device (traveling device 7) in step S108.

When the status acquiring unit 40c acquires the information about whether the working vehicle 1 is in a stopped state or is traveling in step S108, the mode switch unit 40d checks whether the working vehicle 1 is in a stopped state or is traveling in step S109.

If the mode switch unit 40d determines that the working vehicle 1 is in a stopped state (Yes in step S109), that is, if the mode switching condition is satisfied, the mode switch unit 40d switches the controller 40 to the first mode in step S110. The controller 40 registers the retained replacement line L4 as a reference line L1 in step S111.

In contrast, if the mode switch unit 40d determines that the working vehicle 1 is traveling (No in step S109), that is, if the mode switching condition is not satisfied, the mode switch unit 40d switches the controller 40 to the second mode in step S112. In step S113, the controller 40 continues to retain the retained replacement line L4 without registering the replacement line L4 as a reference line L1 in step S113.

Although the third variation described above relates to an example where the mode switch unit 40d switches the mode of the controller 40 based on a predetermined condition of whether the vehicle body 3 is in a stopped state or is traveling, the condition may also be applied in a case where, for example, the working vehicle 1 has or has not received the settings related to the automatic steering. Therefore, if the condition is based on whether or not the working vehicle 1 has received the settings related to the automatic steering, the process to be performed when there is a retained replacement line L4 may involve the display controller 21 causing the display screen 22 to display a screen (not illustrated) indicating that the retained replacement line L4 is registered as a reference line L1 in place of the standby screen M12.

In each of the first to third variations described above, the server 50 transmits a replacement line L4 to the communicator 42 in response to a command from the command unit 71b. However, if the replacement line L4 received by the communicator 42 from the server 50 is to be retained without being registered as a reference line L1 when the controller 40 is in the second mode, as in the third variation, the server 50 may transmit the replacement line L4 to the communicator 42 in accordance with the position of the vehicle body 3 regardless of a command from the command unit 71b.

In this case, the database 53 stores a plurality of reference lines L1 (replacement lines L4) in association with positional information of respective agricultural fields G. In detail, the database 53 stores positional information of each agricultural field G as work information stored in association with the corresponding reference line L1.

Furthermore, the communicator 42 transmits the position of the vehicle body 3 detected by the detector 43 to the server 50 in predetermined cycles.

Figure 27:
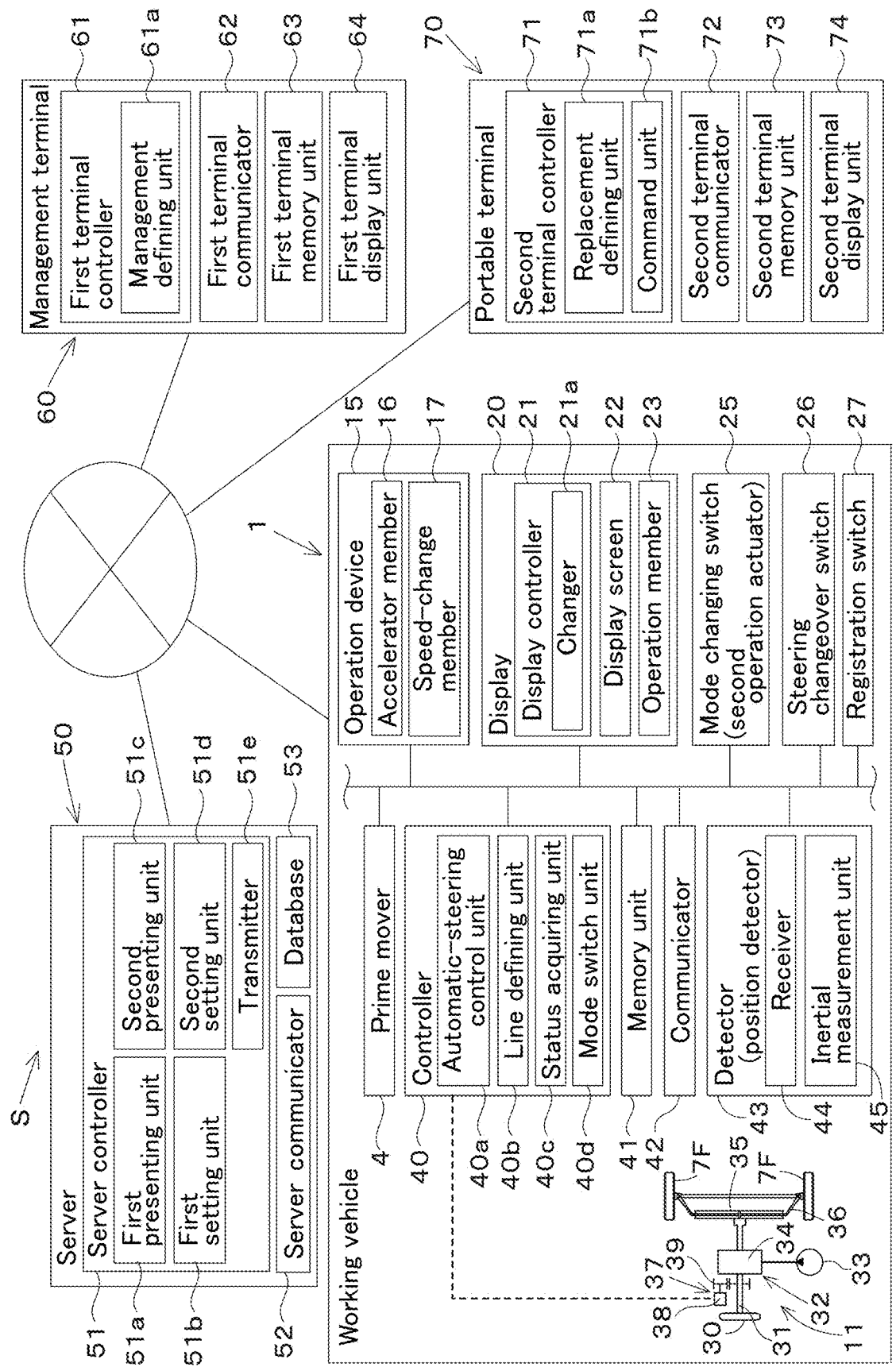
FIG. 27 is an overall view of the working-vehicle support system according to a fourth variation of a preferred embodiment of the present invention.

As illustrated in FIG. 27, the server 50 includes a transmitter 51e. In accordance with the position of the vehicle body 3 transmitted from the communicator 42, the transmitter 51e transmits a replacement line L4 stored in the database 53 and corresponding to the position to the communicator 42. The transmitter 51e is provided in the server controller 51 and includes electric and electronic component(s) provided in the server controller 51 and/or program(s).

The transmitter 51e acquires the current vehicle-body position P of the working vehicle 1 via the server communicator 52 and the communicator 42. Based on positional information indicating the acquired vehicle-body position P, the transmitter 51e determines which of the agricultural fields G the working vehicle 1 is located in. The transmitter 51e acquires, from the database 53, a reference line L1 corresponding to the agricultural field G where the working vehicle 1 is located and corresponding to the information about the working vehicle 1, the information about the working device 2 used in the work by the working vehicle 1, the work content of the working device 2, and the information about the crop to be produced in the agricultural field G. The transmitter 51e transmits the acquired reference line L1 as a replacement line L4 to the controller 40 via the communicator 42 and the server communicator 52.

The above-described preferred embodiment relates to an example where the management terminal 60 includes the management defining unit 61a. Alternatively, instead of defining a candidate line L3 in advance in the management terminal 60, the replacement defining unit 71a may select a predetermined replacement line L4 in response to an operation from among the reference lines L1 (replacement lines L4) stored in the database 53, instead of setting a candidate line L3.

A support system S for a working vehicle 1 as has been discussed includes a working vehicle 1 including a vehicle body 3, a controller 40, and a communicator 42, the vehicle body 3 being operable to travel selectively under manual steering using a steering device 11 or under automatic steering using the steering device 11, the controller 40 being configured or programmed to define a planned travel line L2 for the automatic steering based on a reference line L1 and to control the automatic steering, the communicator 42 being configured or programmed to receive a replacement line L4 to replace the reference line L1 defined by the controller 40, and a server 50 to transmit the replacement line L4 to the communicator 42, wherein the controller 40 is configured or programmed to include a status acquiring unit 40c to acquire a status of a device provided in or on the working vehicle 1, and to switch between a first mode and a second mode in accordance with the status acquired by the status acquiring unit 40c, the first mode being a mode in which the controller 40 replaces the reference line L1 with the replacement line L4 transmitted from the server 50, the second mode being a mode in which the controller 40 does not replace the reference line L1 with the replacement line L4 transmitted from the server 50.

With the above configuration, even when the server 50 transmits the replacement line L4 to the communicator 42, the controller 40 in the second mode does not replace the reference line L1 with the replacement line L4 and controls the automatic steering based on the reference line L1. Accordingly, the controller 40 does not control the automatic steering based on the updated reference line L1 obtained by replacing the reference line L1 with the replacement line L4, thus preventing or reducing traveling on an unintended path.

The working vehicle 1 may include a first operation actuator 221, 251 to receive an operation and change a setting relating to the automatic steering. The status acquiring unit 40c may be configured or programmed to acquire information indicating that the first operation actuator 221, 251 has received the operation to change the setting or has not received the operation to change the setting. The controller 40 may be configured or programmed to enter the first mode if the status acquiring unit 40*c* acquires information indicating that the first operation actuator 221, 251 has received the operation to change the setting, and enter the second mode if the status acquiring unit 40*c* acquires information indicating that the first operation actuator 221, 251 has not received the operation to change the setting.

With the above configuration, if the setting relating to the automatic steering is not performed, that is, if the operator does not intend to change the settings relating to the automatic steering, the controller 40 can eliminate or reduce the likelihood that the reference line L1 will be replaced with the received replacement line L4.

The working vehicle 1 may include a second operation actuator 25 to receive an operation and enable or disable the automatic steering. The status acquiring unit 40*c* may be configured or programmed to acquire information indicating that the automatic steering is enabled or disabled by the second operation actuator 25. The controller 40 may be configured or programmed to enter the first mode if the status acquiring unit 40*c* acquires information indicating that the automatic steering is disabled by the second operation actuator 25, and enter the second mode if the status acquiring unit 40*c* acquires information indicating that the automatic steering is enabled by the second operation actuator 25.

With the above configuration, the controller 40 can replace the reference line L1 with the received replacement line L4 only when the automatic steering is not performed. Therefore, when the controller 40 is controlling the automatic steering, the received replacement line L4 does not replace the reference line L1 during the control, thus eliminating or reducing the likelihood that the automatic steering will be performed along an unintended path.

The status acquiring unit 40*c* may be configured or programmed to acquire information indicating that the vehicle body 3 has stopped traveling or is traveling. The controller may be configured or programmed to enter the first mode if the status acquiring unit 40*c* acquires information indicating that the vehicle body 3 has stopped traveling, and enter the second mode if the status acquiring unit 40*c* acquires information indicating that the vehicle body 3 is traveling.

With the above configuration, the controller 40 can replace the reference line L1 with the received replacement line L4 only if the vehicle body 3 has stopped traveling. This makes it possible to eliminate or reduce the likelihood that the controller 40 will replace the reference line L1 with the replacement line L4 during travel of the vehicle body 3, i.e., at least while the controller is controlling the automatic steering.

The controller 40 may be configured or programmed to, when the controller 40 is in the first mode, allow the communicator 42 to receive the replacement line L4 from the server and when the controller 40 is in the second mode, restrict the communicator 42 from receiving the replacement line L4 from the server 50.

With the above configuration, even when the server 50 tries to transmit the replacement line L4 to the communicator 42, the communicator 42 does not receive the replacement line L4 during the second mode, so that the controller 40 does not replace the reference line L1 with the replacement line L4. Accordingly, it is possible to eliminate or reduce the likelihood that the controller 40 will control the vehicle body 3 based on an unintended path.

The controller (40) may be configured or programmed to, when the controller (40) is in the first mode, register, as the reference line (L1), the replacement line (L4) received by the communicator (42) from the server (50), and when the controller (40) is in the second mode, retain the replacement line (L4) received by the communicator (42) from the server (50) without registering the replacement line (L4) as the reference line (L1), and register the retained replacement line (L4) as the reference line (L1) when the controller (40) enters the first mode.

With the above configuration, even when the server 50 tries to transmit the replacement line L4 to the communicator 42, the controller 40 in the second mode does not register the replacement line L4. Moreover, upon switching to the first mode, the controller 40 can register the retained replacement line L4. With this, it is possible to eliminate or reduce the likelihood that the controller 40 will control the vehicle body 3 based an unintended path, and, by causing the controller 40 to pre-receive the replacement line L4 while in the second mode, possible to cause the controller 40 to efficiently register the replacement line L4 upon switching to the first mode.

The working vehicle 1 may include a display 20 to display the replacement line L4 received by the communicator 42.

With the above configuration, by checking the display 20, the operator can easily know whether or not the replacement line L4 is an intended line.

The display 20 may include a changer 21*a* to change the replacement line L4 received by the communicator 42 in accordance with what operation is performed.

With the above configuration, the operator can operate the display 20 to change the replacement line L4. Therefore, the controller 40 can register a more appropriate reference line L1 based on the replacement line L4 transmitted from the server 50.

The working vehicle 1 may include a detector 43 to detect a position of the vehicle body 3. The communicator 42 may be configured or programmed to transmit the position of the vehicle body 3 detected by the detector 43 to the server 50. The server 50 may be operable to transmit the replacement line L4 to the communicator 42 in accordance with the position of the vehicle body 3.

With the above configuration, the controller 40 can automatically update the reference line L1 in accordance with the position of the vehicle body 3.

The server 50 may include a database 53 to store a plurality of the replacement lines L4 in association with respective pieces of positional information of respective agricultural fields G, and a transmitter 51*e* to transmit, to the communicator 42, one of the plurality of replacement lines L4 stored in the database 53 that corresponds to the position of the vehicle body 3 transmitted from the communicator 42 in accordance with the position of the vehicle body 3.

With the above configuration, the controller 40 can automatically update the reference line L1 such that the reference line L1 is suitable for the work on the agricultural field G in accordance with the position of the vehicle body 3.

The support system S may further include a portable terminal 70 to communicate with the communicator 42 and the server 50. The portable terminal 70 may include a command unit 71*b* to command the server 50 to transmit the replacement line L4 to the communicator 42 in accordance with what operation is performed on the portable terminal 70.

With the above configuration, even when the command unit 71*b* of the portable terminal 70 commands the server 50 to transmit the replacement line L4, the controller 40, when in the second mode, does not replace the reference line L1 with the replacement line L4 and controls the vehicle body 3 based on the reference line L1. Therefore, even when the operator mistakenly operates the portable terminal 70 and transmits the replacement line L4 or even when another operator operates the portable terminal 70 and transmits the replacement line L4, the controller 40 does not perform the automatic steering based on the updated reference line L1 obtained by replacing the reference line L1 with the replacement line L4, thus eliminating or reducing the likelihood that the vehicle body 3 will travel along an unintended path.

The server 50 may include a database 53 to store a plurality of the replacement lines L4. The portable terminal 70 may include a replacement defining unit 71*a* to receive a selection of one of the plurality of replacement lines L4 stored in the database 53 and define the replacement line L4. The command unit 71*b* may be configured or programmed to command the server 50 to transmit the replacement line L4 defined by the replacement defining unit 71*a* to the communicator 42.

With the above configuration, any replacement line L4 defined by the replacement defining unit 71*a* of the portable terminal 70 can be transmitted to the communicator 42. Accordingly, the working vehicle 1 can perform the automatic steering along the planned travel line L2 based on a more appropriate reference line L1.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A support system for a working vehicle, the support system comprising:
   a working vehicle including a vehicle body, a controller, and a communicator, the vehicle body being operable to travel selectively under manual steering using a steering device or under automatic steering using the steering device, the controller being configured or programmed to define a planned travel line for the automatic steering based on a reference line and to control the automatic steering, the communicator being configured or programmed to receive a replacement line to replace the reference line defined by the controller; and
   a server to transmit the replacement line to the communicator; wherein
   the controller is configured or programmed to:
   include a status acquirer to acquire a status of a device provided in or on the working vehicle; and
   switch between a first mode and a second mode in accordance with the status acquired by the status acquirer, the first mode being a mode in which the controller replaces the reference line with the replacement line transmitted from the server, the second mode being a mode in which the controller does not replace the reference line with the replacement line transmitted from the server.

2. The support system according to claim 1, wherein
   the working vehicle includes a first operation actuator to receive an operation and change a setting relating to the automatic steering;
   the status acquirer is configured or programmed to acquire information indicating that the first operation actuator has received the operation to change the setting or has not received the operation to change the setting; and
   the controller is configured or programmed to:
   enter the first mode if the status acquirer acquires information indicating that the first operation actuator has received the operation to change the setting; and
   enter the second mode if the status acquirer acquires information indicating that the first operation actuator has not received the operation to change the setting.

3. The support system according to claim 1, wherein
   the working vehicle includes a second operation actuator to receive an operation and enable or disable the automatic steering;
   the status acquirer is configured or programmed to acquire information indicating that the automatic steering is enabled or disabled by the second operation actuator; and
   the controller is configured or programmed to:
   enter the first mode if the status acquirer acquires information indicating that the automatic steering is disabled by the second operation actuator; and
   enter the second mode if the status acquirer acquires information indicating that the automatic steering is enabled by the second operation actuator.

4. The support system according to claim 1, wherein
   the status acquirer is configured or programmed to acquire information indicating that the vehicle body has stopped traveling or is traveling; and
   the controller is configured or programmed to:
   enter the first mode if the status acquirer acquires information indicating that the vehicle body has stopped traveling; and
   enter the second mode if the status acquirer acquires information indicating that the vehicle body is traveling.

5. The support system according to claim 1, wherein the controller is configured or programmed to:
   when the controller is in the first mode, allow the communicator to receive the replacement line from the server; and
   when the controller is in the second mode, restrict the communicator from receiving the replacement line from the server.

6. The support system according to claim 1, wherein the controller is configured or programmed to:
   when the controller is in the first mode, register, as the reference line, the replacement line received by the communicator from the server; and
   when the controller is in the second mode, retain the replacement line received by the communicator from the server without registering the replacement line as the reference line, and register the retained replacement line as the reference line when the controller enters the first mode.

7. The support system according to claim 1, wherein the working vehicle includes a display to display the replacement line received by the communicator.

8. The support system according to claim 7, wherein the display includes a changer to receive a change to the replacement line received by the communicator.

9. The support system according to claim 1, wherein
   the working vehicle includes a detector to detect a position of the vehicle body;

the communicator is configured or programmed to transmit the position of the vehicle body detected by the detector to the server; and the server is operable to transmit the replacement line to the communicator in accordance with the position of the vehicle body.

10. The support system according to claim 9, wherein the server includes:

a database to store a plurality of the replacement lines in association with respective pieces of positional information of respective agricultural fields; and a transmitter to transmit, to the communicator, one of the plurality of replacement lines stored in the database that corresponds to the position of the vehicle body transmitted from the communicator in accordance with the position of the vehicle body.

11. The support system according to claim 1, further comprising:

a portable terminal to communicate with the communicator and the server; wherein the portable terminal includes a command generator to command the server to transmit the replacement line to the communicator in accordance with what operation is performed on the portable terminal.

12. The support system according to claim 11, wherein the server includes a database to store a plurality of the replacement lines;

the portable terminal includes a replacement line definer to receive a selection of one of the plurality of replacement lines stored in the database and define the replacement line; and the command generator is configured or programmed to command the server to transmit the replacement line defined by the replacement line definer to the communicator.

* * * * *